US012779752B2

(12) United States Patent
Zeidlhofer et al.

(10) Patent No.: US 12,779,752 B2
(45) Date of Patent: Nov. 3, 2026

(54) ARRANGEMENT WITH A FIRST CLAMPING UNIT FOR A MOLDING MACHINE

(71) Applicant: ENGEL AUSTRIA GmbH, Schwertberg (AT)

(72) Inventors: Herbert Zeidlhofer, Haag (AT); Guenter Schott, St. Valentin (AT); Anton Lohnecker, Ertl (AT); Lukas Gugler, St. Peter (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 498 days.

(21) Appl. No.: 18/232,094

(22) Filed: Aug. 9, 2023

(65) Prior Publication Data

US 2024/0059001 A1 Feb. 22, 2024

(30) Foreign Application Priority Data

Aug. 16, 2022 (AT) .............................. A 50626/2022

(51) Int. Cl.
*B29C 45/67* (2006.01)
*B29C 45/76* (2006.01)
*B29C 45/82* (2006.01)

(52) U.S. Cl.
CPC .......... *B29C 45/67* (2013.01); *B29C 45/7653* (2013.01); *B29C 45/82* (2013.01);
(Continued)

(58) Field of Classification Search
None
See application file for complete search history.

(56) References Cited

U.S. PATENT DOCUMENTS 4,383,816 A * 5/1983 Kumazaki ............... B29C 45/67 425/451.9
4,753,592 A 6/1988 Kaaden
(Continued)

FOREIGN PATENT DOCUMENTS

CN 101888921 11/2010
CN 203077567 7/2013
(Continued)

OTHER PUBLICATIONS

Office Action issued Sep. 19, 2024 in German Patent Application No. 10 2023 119 506.9, with Partial English Translation.
(Continued)

*Primary Examiner* — Jacob T Minskey
*Assistant Examiner* — Adrien J Bernard
(74) *Attorney, Agent, or Firm* — Wenderoth, Lind & Ponack, L.L.P.

(57) ABSTRACT

An arrangement with a first clamping unit including a first fixed platen and a first movable platen movable relative thereto, a first clamping force mechanism to apply a clamping force to the first movable platen, and a control or regulating unit for controlling or regulating the first clamping force mechanism. Arranged next to and/or above the first clamping unit is a second clamping unit including a second fixed platen or the first fixed platen and a second movable platen movable relative thereto and which are suitable for carrying at least one mold, and a second clamping force mechanism to apply a clamping force to the second movable platen. The control or regulating unit can actuate the first clamping force mechanism and the second clamping force mechanism to apply a clamping force synchronously when all platens present jointly carry a mold.

22 Claims, 16 Drawing Sheets

(52) U.S. Cl.
CPC ............... *B29C 2945/76505* (2013.01); *B29C 2945/76709* (2013.01); *B29C 2945/76869* (2013.01)

(56) References Cited

U.S. PATENT DOCUMENTS

| | | | | | |
|---|---|---|---|---|---|
| 4,793,796 | A | 12/1988 | Kaaden | | |
| 5,911,924 | A * | 6/1999 | Siegrist | B29C 45/76 | 264/40.1 |
| 6,658,318 | B1 * | 12/2003 | Kimura | B29C 45/76 | 700/200 |
| 7,047,780 | B2 | 5/2006 | Marando et al. | | |
| 10,843,418 | B2 | 11/2020 | Drees et al. | | |
| 2003/0126902 | A1 | 7/2003 | Marando et al. | | |
| 2008/0265465 | A1 | 10/2008 | Glaesener | | |
| 2019/0030838 | A1 | 1/2019 | Drees et al. | | |
| 2021/0402661 | A1 * | 12/2021 | Yeh | B29C 45/53 | |

FOREIGN PATENT DOCUMENTS

| | | |
|---|---|---|
| DE | 28 780 | 1/1985 |
| DE | 10 2005 017 878 | 9/2006 |
| DE | 602 19 717 | 1/2008 |
| DE | 10 2016 101 631 | 8/2017 |
| JP | 2020-151951 | 9/2020 |

OTHER PUBLICATIONS

Johannaber, Michaeli. Injection molding manual Johannaber, F./Michaeli, W. Injection molding manual, Section 8: Types of injection molding machines 2001, pp. 1000-1050; discussed in section 4.1 of English translation of CA (German OA) provided herein.

* cited by examiner

ARRANGEMENT WITH A FIRST CLAMPING UNIT FOR A MOLDING MACHINE

BACKGROUND OF THE INVENTION

The present invention relates to an arrangement, and a method for operating an arrangement with a first clamping unit and at least one second clamping unit for a molding machine.

In practice, it is apparent that the desire for larger clamping units for molding machines is increasing, for example, in order to manufacture larger injection-molded parts.

At the same time, modern clamping units are pushing the limits of what is reasonably feasible in terms of their size, because they will simply no longer be able to be transported effectively if their size is further increased. Restrictions in this respect originate for example from maximum transport weights, standard container sizes and the available space during transport by rail or by HGV, thus basically the transport infrastructure.

As it is not easy to improve the transport infrastructure in this respect, a desire for larger clamping units can be satisfied only with substantially increased technical effort, by constructing the clamping units for example such that they can be freighted in separate parts or in groups of components.

SUMMARY OF THE INVENTION

The object of the present invention is therefore to provide larger clamping units for molding machines, without having to make a disproportionately large amount of technical effort.

This object is achieved with respect to the clamping unit described below, namely by an arrangement with a first clamping unit for a molding machine, including:

- a first fixed platen and a first movable platen that can be moved relative thereto, which are suitable for carrying at least one mold,
- at least one first clamping force mechanism, which is formed to apply a clamping force to the first movable platen, and
- a control or regulating unit, which is designed to control or regulate the first clamping force mechanism.

Arranged next to the first clamping unit is at least one second clamping unit, including:

- a second fixed platen or the first fixed platen and a second movable platen that can be moved relative thereto, which are suitable for carrying at least one mold, and
- at least one second clamping force mechanism, which is formed to apply a clamping force to the second movable platen.

The control or regulating unit is designed:

- to control or regulate the at least one second clamping force mechanism, and
- to actuate the at least one first clamping force mechanism and the at least one second clamping force mechanism to apply a clamping force synchronously when the first fixed platen, the first movable platen, optionally the second fixed platen and the second movable platen jointly carry at least one mold.

Protection is also sought for a method for operating an arrangement with a first clamping unit and at least one second clamping unit for a molding machine, wherein:

- the at least one second clamping unit is arranged next to the first clamping unit, and

- a first partial clamping force is applied to at least one first movable platen of the first clamping unit by a first clamping force mechanism, and
- at least one second partial clamping force is applied to at least one second movable platen of the at least one second clamping unit by at least one second clamping force mechanism, and
- the first partial clamping force and the at least one second partial clamping force are applied synchronously.

Protection is furthermore sought for a molding machine with an arrangement according to the invention.

By molding machines may be meant injection-molding machines, transfer-molding machines, presses and the like.

At first glance, it seems to be somewhat farfetched that two clamping units arranged next to each other can jointly carry at least one mold and be operated synchronously. However, tests by the applicant have surprisingly revealed that the static requirements for the clamping unit and the requirements for the accuracy of the synchronous control or regulation can indeed be met.

Of course, even larger clamping units can be realized by providing further (third, fourth etc.) clamping units next to the first clamping unit and the second clamping unit.

In a preferred embodiment, the first and the at least one second clamping unit in each case have a fixed platen, wherein the first fixed platen and the at least one second platen are implemented separate from each other.

The possibility of arranging several clamping units next to each other and/or one above another, in particular with clamping axes aligned parallel to each other, has the advantage of realizing clamping sides or platen surfaces that are as large as desired in a flexible manner while the individual component size remains the same.

It is advantageous that the handling, manufacture, and transport can be effected using standard equipment.

The possibility of arranging several clamping units next to each other has the further advantage that through a variable positioning of the movable platens, the at least one mold need not necessarily be cuboid-shaped, whereby an optimization of the geometry and/or mass of the at least one mold is made possible.

The first clamping unit and the at least one second clamping unit, or the first fixed platen, the first movable platen, the second fixed platen and optionally the second movable platen, are formed to jointly carry at least one mold.

It is also possible for the first clamping unit and the at least one second clamping unit to have a single fixed platen, with the result that the first fixed platen, the first movable platen, and optionally the second movable platen jointly carry at least one mold.

The joint carrying is to be understood such that at least one mold is jointly carried by at least two clamping units.

In other words, this means that at least one mold at least partially extends into at least two mold regions of at least two clamping units.

A further advantage is that through a variable positioning of the movable platens and/or the tension and pressure rods and/or drives an optimum clamping force distribution can be realized. For example, a weight saving can thereby be made possible for the platens.

Advantages of smaller clamping units are, for example, that:

- the manufacture of their subelements requires less manufacturing effort, and/or
- the assembly and disassembly can be carried out more easily due to smaller components, and/or the transport and/or manufacture are more favorable from an ecological and/or economic point of view.

The arrangement according to the invention can be realized for both horizontal and vertical molding machines. That is to say the clamping units arranged next to each other have clamping axes which are parallel to each other and which can be aligned vertically or horizontally.

By a clamping axis is meant the substantially linear movement direction in which a movable platen can be moved.

Both already existing clamping units and additional clamping units can be used for the implementation of the arrangement according to the invention, whereby it is for example made possible that an arrangement according to the invention can be realized in the course of a retrofitting.

In principle, many clamping units from the state of the art have separate drives for a fast stroke movement, and a power stroke. This can also be provided for the first clamping unit and/or the second clamping unit in the invention.

By a drive may be meant, for example, a hydraulic cylinder and/or a spindle drive.

The fast stroke, which can be realized for example by means of an electric, hydraulic or magnetic drive, serves to move the movable platens faster in order to be able to carry out a closing or opening movement.

The power stroke serves for clamping force application in the sense of applying a force and is not necessarily to be understood literally as a movement.

The drives, which are different from each other, for the fast stroke and the power stroke can also be called fast stroke drive and power stroke drive respectively.

The power stroke drives, for example four hydraulic cushions of a two-plate clamping unit, can then be called clamping force mechanism.

In the present case, there is a first clamping force mechanism of the first clamping unit and a second clamping force mechanism of the second clamping unit.

By the fact that the clamping force application to the first and the second movable platen are carried out synchronously may be meant that there is at least one point in time at which a partial clamping force is applied in each case to both the first movable platen and the second movable platen. This means, in other words, that the time intervals between the partial clamping force applications for the first and the second clamping unit have at least a certain overlap.

In particularly preferred embodiments, the partial clamping force applications to the first and the second movable platen can be completely synchronous. That is to say, the intervals between the partial clamping force applications can be identical, with respect to both their length and their start and end points.

The sum of the partial clamping forces gives a total clamping force.

It is to be mentioned that the first clamping unit and the second clamping unit can be clamping units of the same or in each case different types.

In preferred embodiments, the movements of the first and the second movable platen can be implemented synchronously, by which may be meant that there is at least one point in time at which both the first movable platen and the second movable platen are moved. This means, in other words, that the time intervals in which the movable platens of the first and the second clamping unit are moved have at least a certain overlap.

In particularly preferred embodiments, in particular when the first fixed platen, the first movable platen, the second fixed platen and the second movable platen jointly carry at least one mold, the movements of the first and the second movable platen can be completely synchronous. That is to say, the start and end positions, the start and end points and/or the speeds of the movable platens can be identical.

The clamping units are moved sequentially, wherein a single clamping force mechanism and/or drive could be provided for two or more clamping units.

The first clamping unit and the at least one second clamping unit can in each case have at least one hydraulic and/or electric drive.

By a hydraulic drive is meant, for example, a hydraulic cylinder or hydraulic or pressure cushion, wherein this is preferably used for the power stroke.

By an electric drive is meant, for example, an electric machine the driving movements of which can be converted into linear movements via a ball screw or spindle drive, wherein electric drives can preferably be used for a fast stroke movement.

The clamping force application to the first and the at least one second clamping unit can be based on different clamping force mechanisms, which is why the first and second clamping units can consist of different components.

As a particularly preferred embodiment, the first and second clamping units in each case have at least one fixed platen and a movable platen, i.e., they are two-plate clamping units.

Alternatively, the first clamping unit and the at least one second clamping unit can also have several, preferably three, plates, for example through the additional arrangement of in each case one end plate.

In the case of the use of hydraulic drives, it is preferable that the first clamping force mechanism is connected to a first hydraulic line system, and the at least one second clamping force mechanism is connected to at least one second hydraulic line system.

A hydraulic line system is a system of hydraulic lines, via which hydraulic oil is fed to one or more hydraulic cylinders and via which a pump system drives one or more consumers, such as for example hydraulic cylinders, by means of a pressure application.

A hydraulic line system can comprise different types of valves and/or be connected to different types of valves.

The detailed implementation, e.g. the type and/or arrangement of the valves, of a hydraulic line system usually depends on whether a fast stroke movement or a power stroke is involved.

The arrangement of at least one valve, in particular of at least one proportional valve, for example a 4/3-way proportional valve, via which the direction and/or speed of the at least one hydraulic cylinder can be controlled or regulated, is preferred for the operation of a first clamping unit and/or at least one second clamping unit.

The direction and/or speed of the at least one hydraulic cylinder can be controlled or regulated by unblocking and/or blocking selected lines of the first hydraulic line system and/or of the at least one second hydraulic line system, in particular by different types of valves, wherein the fluid flow within the first hydraulic line system and/or the at least one second hydraulic line system is controlled or regulated.

In the case of two-plate clamping units, two hydraulic cylinders per clamping unit are preferably used, which are preferably driven by a single pump system.

A pump system comprises at least one pump and/or is part of a closed or open hydraulic line system and/or is connected to a hydraulic line system.

The advantage of the use of a common pump system for feeding two or more hydraulic cylinders is that a symmetrical introduction of force is possible because of the lines connected directly to each other, which can be understood to be communicating vessels. That is to say the introduction of force and/or clamping force application to the individual hydraulic cylinders can be effected completely synchronously and with the same pressure profile.

If two or more clamping units are now arranged against each other, i.e. next to each other and/or one above another, it is particularly preferably provided that the first hydraulic line system, preferably connected to the first clamping force mechanism and/or fast stroke mechanism, and the at least one second hydraulic line system, preferably connected to the at least one second clamping force mechanism and/or fast stroke mechanism, are implemented such that they can be interconnected.

For this purpose, at least one valve, in particular a control valve, via which the hydraulic lines of the first hydraulic line system and the at least one second hydraulic line system can be interconnected, is arranged between the first hydraulic line system and the at least one second hydraulic line system.

When two or more hydraulic line systems are interconnected, there is a continuous fluid flow and/or a closed hydraulic oil circuit within the combined hydraulic line systems. That is to say the first hydraulic line system and the at least one second hydraulic line system produce a single system of communicating hydraulic lines.

When two or more clamping units are operated with a single system of communicating hydraulic lines, the first clamping force mechanism and/or at least one fast stroke drive and the at least one second clamping force mechanism and/or at least one fast stroke drive can be fed using one or more pump systems.

When two or more clamping units are operated with a single system of communicating hydraulic lines, the first clamping force mechanism and/or at least one fast stroke drive and/or the at least one second clamping force mechanism and/or at least one fast stroke drive can be controlled or regulated using one or more valves, such as e.g. proportional valves.

Whether one or more pump systems and/or valves are used depends on various factors.

These factors can be for example of a mechanical and/or drive-technology, electrical-engineering or control-technology and/or safety-related and/or practical and/or economic nature and/or can depend on the molding machine and/or the mold and/or material properties or the like.

Through the operation of two or more clamping units with a single system of communicating hydraulic lines, an asymmetrical clamping force application, which is in many cases unintentional, can be avoided.

In particular, in the event of failure, for example when a valve, e.g. proportional valve, fails, the parallelism of the first movable platen and the at least one second movable platen can thereby be substantially retained.

In the case of separate individual operation of the first clamping unit and/or the at least one second clamping unit, the first clamping force mechanism and/or at least one fast stroke drive and the at least one second clamping force mechanism and/or at least one fast stroke drive can be operable entirely independently of each other.

This means that in the case of individual operation of two or more clamping units, the first hydraulic line system and the at least one second hydraulic line system are preferably decoupled from each other.

It is particularly preferable that the first clamping unit and the at least one second clamping unit are mechanically movement-coupled, in particular when the first clamping force mechanism and the at least one second clamping force mechanism are operated completely synchronously, thus in parallel operation.

However, a mechanical movement coupling is not imperative.

The mechanical movement coupling can be effected by at least one jointly carried mold or by one or more mechanical coupling elements.

Mechanical coupling elements are for example flexible connecting elements (e.g. a flexure bearing and/or Flex-Link element), tongue and groove systems (e.g. by means of keys), screw connections (optionally with spring pretensioning, e.g. by means of plate springs) or screwed-on thin connecting plates, which are attached to the fixed and/or the movable platens and/or the clamping frames of the first and the at least one second clamping unit.

Flexible connecting elements favorably have substantially elastic properties, therefore allow a temporary deformation and/or have an elastic effect.

A mechanical movement coupling is preferably provided for clamping axes, arranged substantially parallel to each other, of the first and the at least one second clamping unit, in particular in order to achieve identical movement profiles of the first and the at least one second clamping unit. Identical movement profiles can be understood such that the start and end points and the movement speeds of the first and the at least one second movable platen are identical.

In order to achieve identical movement profiles of the first and at least one second movable platen, the mechanical movement coupling is preferably implemented such that the movable platens are arranged coplanar relative to each other, which means that they lie substantially in one plane.

In the mechanically decoupled or coupled state of the first and at least one second movable platen of an arrangement with parallel-aligned clamping axes, the movable platens can arrive at different positions that are substantially parallel to each other. This means, in other words, that the spacing between the first fixed platen and the first movable platen can differ from the spacing between the at least one second fixed platen and the at least one second movable platen.

As an alternative to a mechanical coupling of the fixed platens, there can be a material-bonding connection, for example by gluing, welding, or soldering.

It is particularly preferable that the first and the at least one second clamping unit are controlled or regulated coupled.

By coupled control or regulation may be meant that relevant control or regulation parameters, such as e.g., an actual or target value of a partial clamping force, a deformation, a tension and/or pressure value, a driving power parameter etc., of the first clamping unit influence the control of the at least one second clamping unit, and vice versa.

In the case of a mechanical movement coupling of the first and the at least one second clamping unit, the first and the at least one second clamping unit are usually controlled or regulated coupled by the control or regulating unit, for example based on position sensors.

It is particularly preferable that at least one movable separator is arranged between the first clamping unit and the at least one second clamping unit.

By a movable separator is meant, for example, a displaceable separating protective device.

When the first fixed platen, the first movable platen, the second fixed platen and the second movable platen jointly carry at least one mold, the separator is arranged outside the first mold region of the first clamping unit and outside the second mold region of the at least one second clamping unit.

By a mold region is meant the region between a fixed and a movable platen, which can receive and/or carry at least one mold.

Due to the separator the first clamping unit and the second clamping unit can also be operated separately. For this purpose, the separator can be brought in between the first clamping unit and the second clamping unit.

The separator can preferably be formed as a separating protective device.

As a particularly preferred embodiment variant the first and at least one second clamping unit in each case have at least one, preferably four, tension rods or rails which at least partially penetrate the fixed and/or movable platens.

In the case of the use of at least one tension rod, it is possible for at least one of these tension rods to be arranged on adjacent side edges of the fixed and/or movable platens of two clamping units lying next to each other with clamping axes aligned parallel to each other, with the result that the drives bring about partial clamping forces for both of these clamping units by these tension rods.

Each tension rod, which is arranged on adjacent side edges of the fixed and/or movable platens, penetrates the first fixed platen and/or the first movable platen and/or the second fixed platen and/or the second movable platen.

To put it simply, this means that two adjacent clamping units share one or more tension or pressure rods.

For two clamping units arranged against each other, this means for example that instead of eight tension rods (with four tension rods per clamping unit, as usually used) only six tension rods are provided.

That can be advantageous, for example, from an economic point of view, as the number of tension rods and corresponding drives can be reduced.

It is preferable that, in the case of the use of tension rods or rails, pressure cushions are used as drives for the clamping force application, thus as power stroke drives.

As a preferred embodiment, the first and second clamping units in each case have at least one, preferably precisely one, preferably centrally arranged, pressure rod.

As a preferred embodiment, the first and second clamping units in each case have at least one toggle joint mechanism.

It is preferable that, in the case of the use of tension rods or toggle joints, hydraulic cylinders are used as drive for the clamping force application. However, other drives are also entirely conceivable, such as for example spindle drives in the case of toggle joint mechanisms.

It is particularly preferable that, in the case of the use of tension rods or rails, at least one pulling device is provided.

These pulling devices are formed to pull the tension rods out of the mold regions of the first and the at least one second clamping unit, with the result that the tension rods lie outside the mold regions. A free space thereby forms, whereby a simplified assembling and disassembling of the molds is possible, which is eminently advantageous in the case of molds with large dimensions.

It is preferable that the first clamping force mechanism and/or the at least one second clamping force mechanism is locked for the clamping force application.

The locking can be effected by the drive and/or by a locking mechanism.

By a locking mechanism is meant for example a locking nut.

The arrangement of the first and at least one second clamping unit is preferably provided such that a spatially flexible arrangement of one or more injection units is made possible.

By a spatially flexible arrangement of the injection units is meant for example that the at least one injection unit can be positioned at all possible angles to the clamping axes of the clamping units, e.g. parallel and/or at right angles to the clamping axes.

In each case, at least one opening can be provided in the fixed and/or movable platens, which makes it possible for the at least one injection unit to dock with and/or press against the at least one mold.

By an opening in the fixed platen and/or in the movable platen is meant, in particular, a cutout the inner wall of which has conical and/or cylindrical sections.

The at least one opening is preferably implemented such that the at least one injection unit can be pressed in a positive-locking manner against the fixed platen and/or the movable platen and/or against the at least one mold.

The advantages of a spatially flexible arrangement of injection units are for example that an optimization of the injection process and/or an optimization of the at least one mold and/or a flexible adaptation to existing structural conditions of a molding machine are made possible.

The optimization of the injection process by means of a flexible arrangement of injection units can be understood for example such that the positions on the at least one mold in which injection is performed can be chosen in a spatially flexible manner, which can be advantageous in particular in the case of geometries that are complex to cast in a mold.

If the injection units can be arranged in a spatially flexible manner, the possibility of optimizing the at least one mold in terms of its geometry exists, which for example in turn makes an optimization of the clamping force application and/or the mold mass possible.

Structural conditions of a molding machine, for example the available space within existing molding machines, can also be taken into consideration in an advantageous manner by means of a spatially flexible arrangement of injection units.

BRIEF DESCRIPTION OF THE DRAWINGS

Further advantages and details of the invention are revealed by the figures and the associated description of the figures, in which.

DETAILED DESCRIPTION OF THE INVENTION

Figure 1:
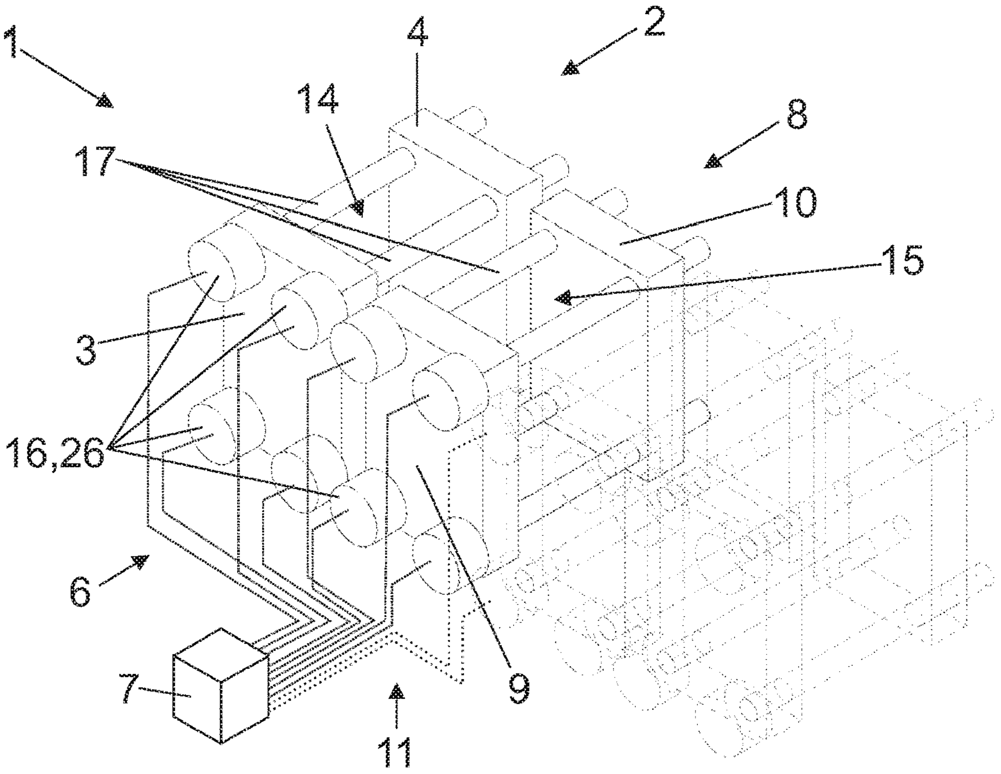
FIG. 1 shows a first embodiment of an arrangement according to the invention.

FIG. 1 shows a first embodiment of an arrangement 1 according to the invention, in which the first clamping unit 2 and the second clamping unit 8 (and possible further clamping units) are arranged next to each other and/or one above the other (collective, "adjacent to") such that their clamping axes are aligned parallel to each other.

In this embodiment, the first clamping unit 2 includes a first fixed platen 3, a first movable platen 4 and a first clamping force mechanism 6, and the at least one second clamping unit 8 includes a second fixed platen 9, a second movable platen 10 and a second clamping force mechanism 11.

In this embodiment, the first clamping unit 2 and the second clamping unit 8 in each case include four tension rods 17 and drives 16, in particular power stroke drives 26.

As an alternative to the implementation with tension rods 17, at least one pressure rod 17 and/or a toggle joint can for example also be provided.

Furthermore, FIG. 1 schematically shows the control or regulating unit (i.e., control unit) 7, which is favorably formed so as to control or regulate the first clamping force mechanism 6 and the second clamping force mechanism 11, together with or separately from the first clamping force mechanism 6.

For example, both clamping units could have separate control or regulating units 7 which are connected to each other via a data connection such that the clamping force application can be synchronized.

In this embodiment, the control or regulating unit 7 controls or regulates the four drives 16, in particular power stroke drives 26, of the first clamping force mechanism 6 and the four drives 16 of the second clamping force mechanism 11.

It is to be mentioned that the control or regulating unit 7 is favorably arranged directly on the machine. In principle, the control or regulating unit 7 could, however, also be realized as a computer server, which is arranged remote from the machine. The control or regulating unit could alternatively or additionally also be realized by distributed computing. Of course, mixed forms are also conceivable.

If further clamping units are arranged next to the first clamping unit 2 and/or the second clamping unit 8, the control or regulating unit 7 in this embodiment also controls the drives 16 of the clamping force mechanisms and/or fast stroke drives 25 of these further clamping units.

FIG. 1 shows in particular the drives 16 and tension rods 17 of the first clamping force mechanism 6 and/or the second clamping force mechanism 11, which are preferably used for the power stroke and thus the clamping force application.

However, drives 16 and tension rods 17 can also be provided for a fast stroke.

In the description of the embodiments shown in FIGS. 2 to 8 that now follow, primarily the differences from the first embodiment will be discussed, to avoid repetitions. Otherwise, the above description of the first embodiment, to the extent to which it may be applicable, also applies to the embodiments also described in the following.

Figure 2:
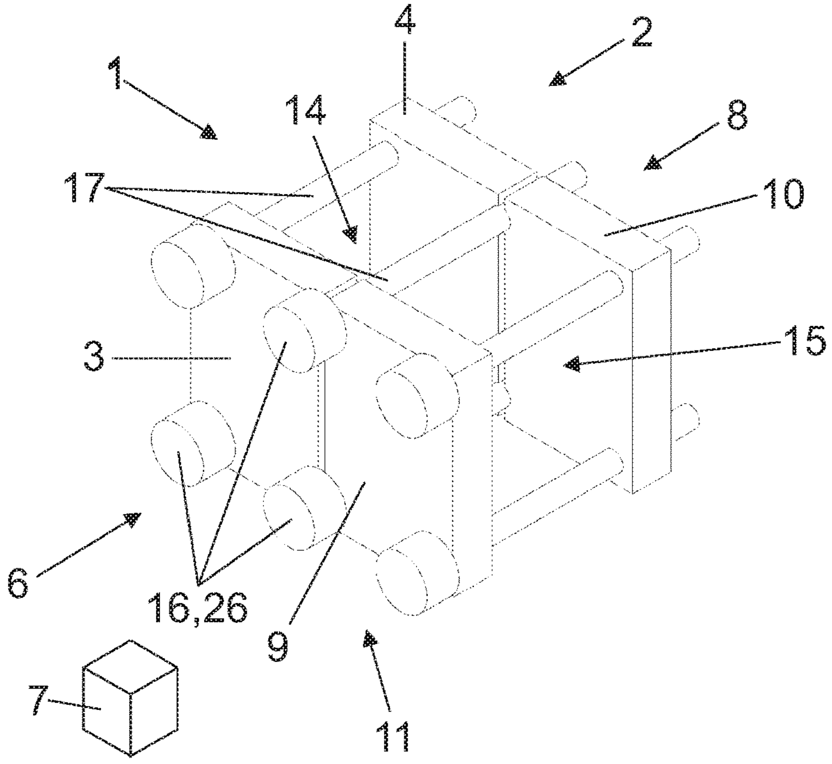
FIG. 2 shows a second embodiment of an arrangement according to the invention.

FIG. 2 shows a second embodiment of an arrangement 1 according to the invention, in which the first clamping unit 2 and the second clamping unit 8 share two of the total of six drives 16, in particular power stroke drives 26, and/or tension rods 17, wherein those two tension rods 17 are located on the adjacent side edges of the first fixed platen 3, the second fixed platen 9, the first movable platen 4 and the second movable platen 10. Unlike FIG. 1, this arrangement 1 therefore has only six drives 16 and/or tension rods 17, instead of eight.

The control or regulating unit 7 is represented simplified in FIG. 2 and in all subsequent figures and embodiments, wherein for the purpose of a clearer representation the connecting lines which illustrate the functional connectivity between the control or regulating unit 7 and the drives 16 of the first clamping force mechanism 6 and the second clamping force mechanism 11 have been dispensed with.

According to the invention, the control or regulating unit 7 is in any case contained in all embodiments with at least the functional features which have already been described.

FIGS. 3*a*-3*d* show four embodiments of an arrangement 1 according to the invention with different mechanical movement couplings 12 between the first clamping unit 2 and the second clamping unit 8.

Figure 3A:
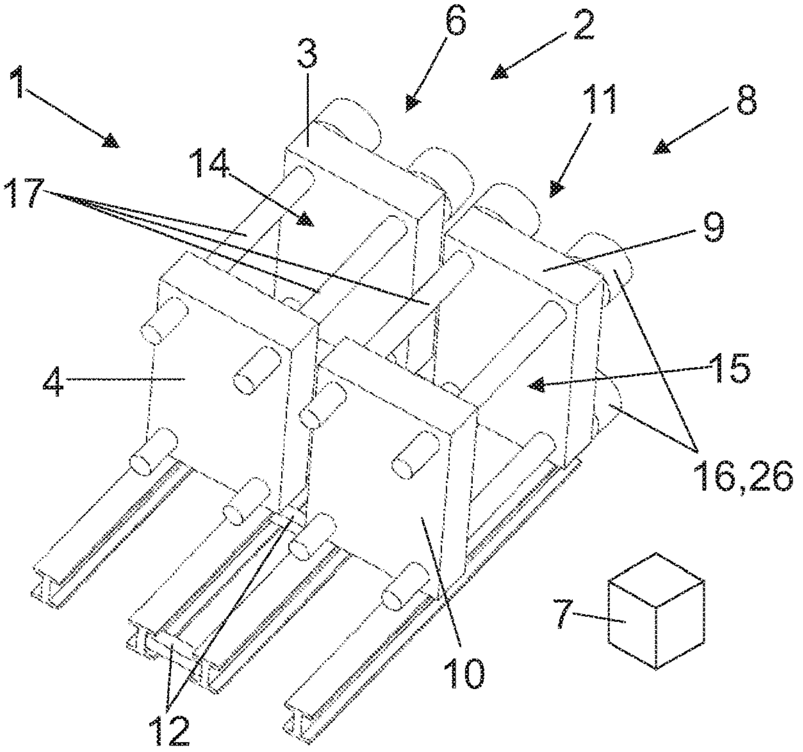
FIGS. 3*a-d* show four embodiments with different mechanical movement couplings.

FIG. 3*a* shows a perspective view of an arrangement 1, wherein the first clamping unit 2 and the at least one second clamping unit 8 are coupled to each other by means of mechanical movement couplings 12 via the clamping frames, for example using crossbars.

Figure 3B:
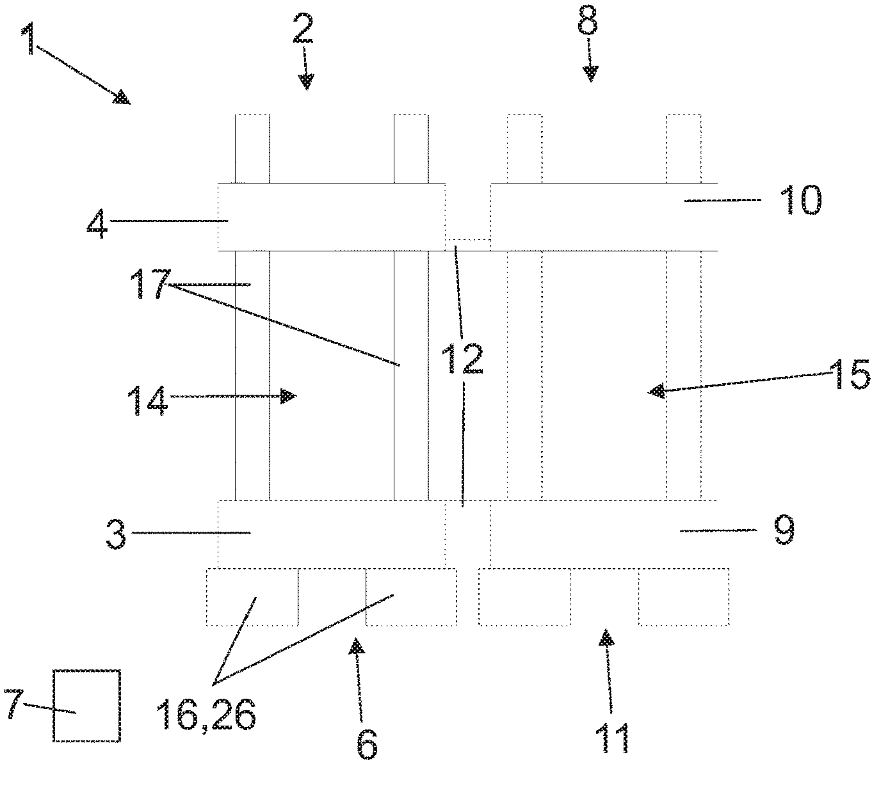

FIG. 3*b* shows an example of an arrangement 1, wherein the first fixed platen 3 is movement-coupled to the second fixed platen 9 and/or the first movable platen 4 is movement-coupled to the second movable platen 10 by means of mechanical movement couplings 12, for example using screwed connecting plates, with the result that the first clamping unit 2 and the at least one second clamping unit 8 are movement-coupled to each other.

Figure 3C:
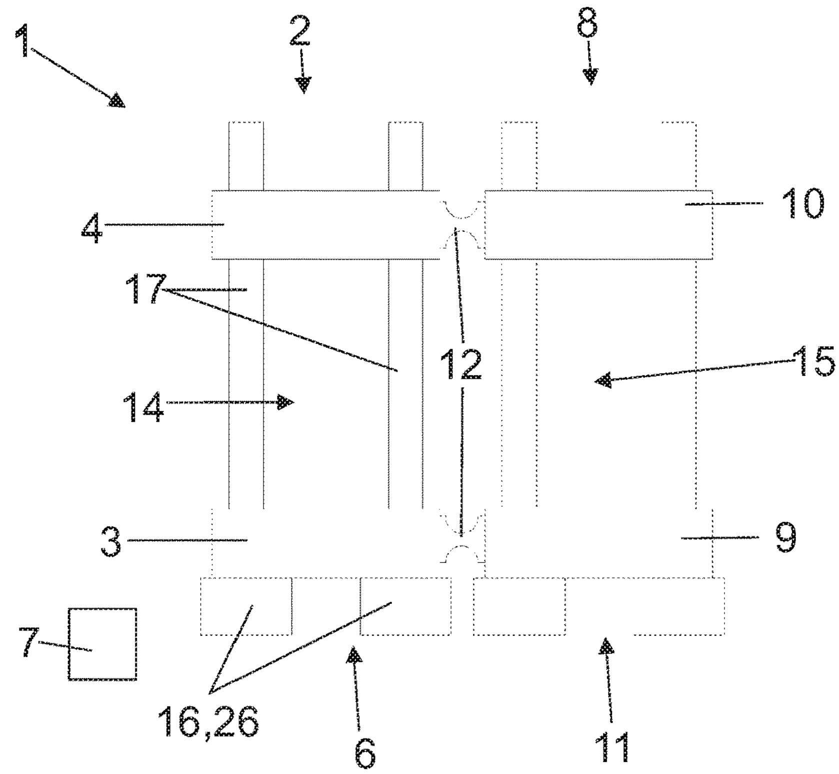

FIG. 3*c* shows an example of an arrangement 1, in which the first clamping unit 2 and the at least one second clamping unit 8 are movement-coupled to each other by means of deformably constructed mold elements 12 between the first fixed platen 3 and the second fixed platen 9 and/or between the first movable platen 4 and the second movable platen 10.

Figure 3D:
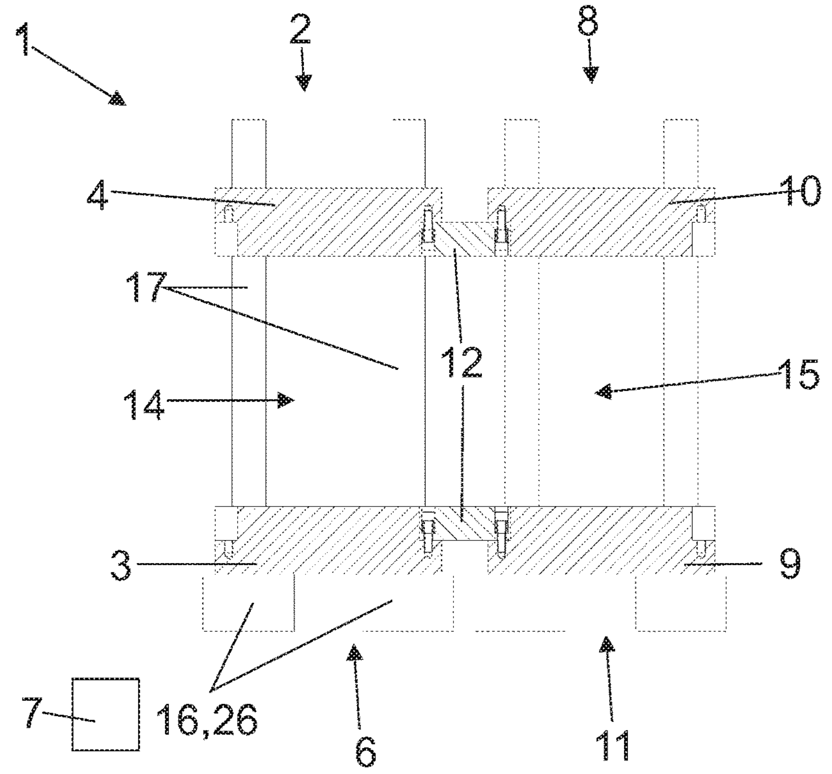

FIG. 3*d* shows an example of an arrangement 1, in which the first clamping unit 2 and the at least one second clamping unit 8 are movement-coupled to each other by means of screw connections 12 between the first fixed platen 3 and the second fixed platen 9 and/or between the first movable platen 4 and the second movable platen 10.

Figure 4A:
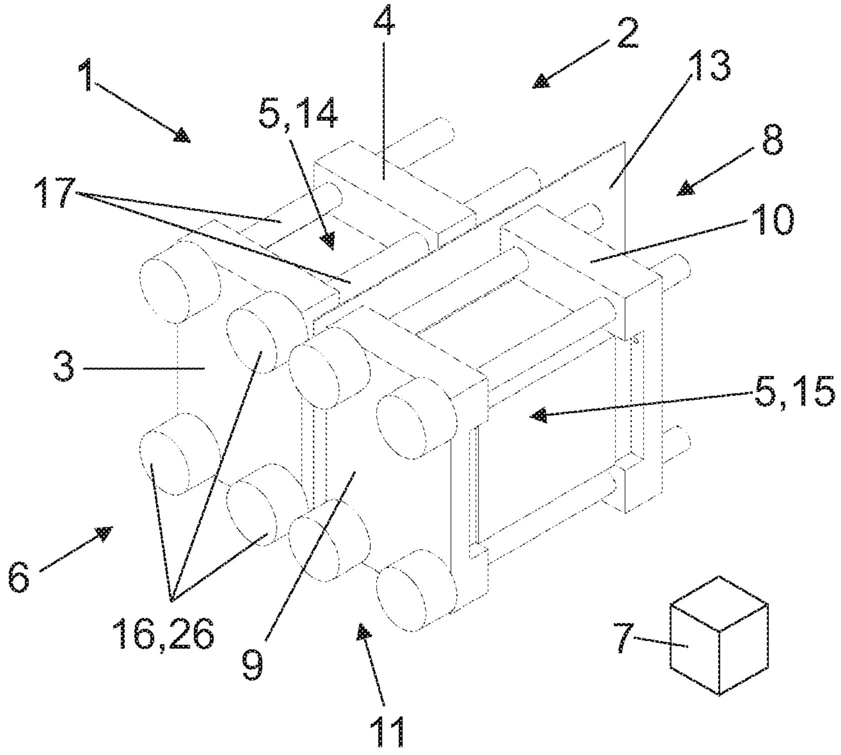
FIGS. 4*a-c* show two embodiments of an arrangement with a separator.
Figure 4B:
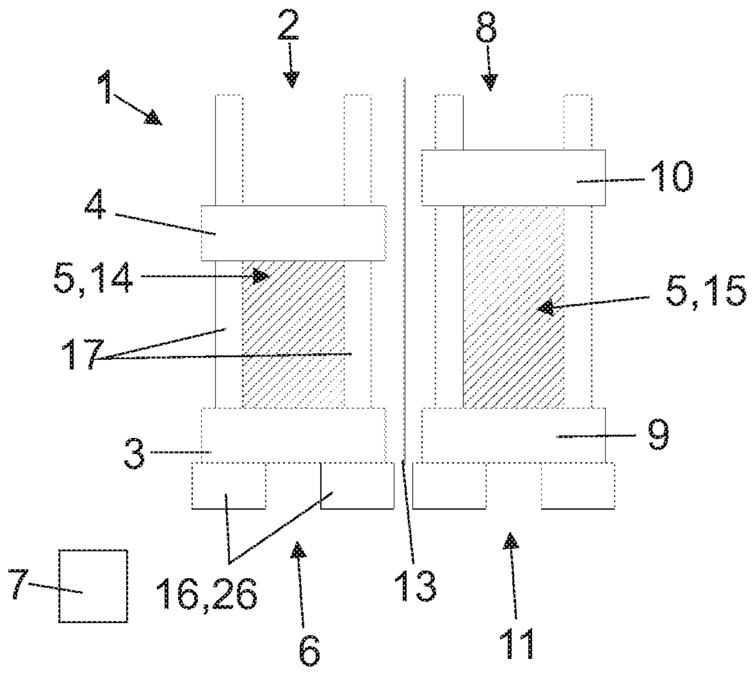
Figure 4C:
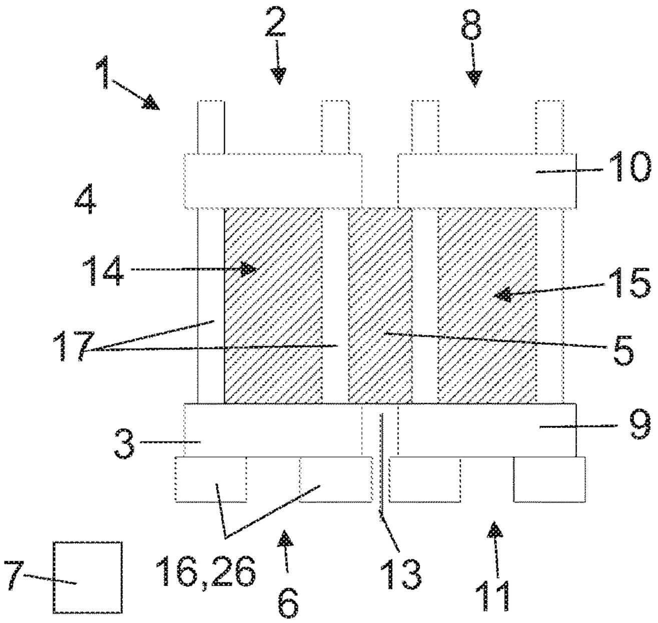

FIGS. 4*a* and 4*b* show a first, and FIG. 4*c* shows a second, embodiment of an arrangement 1 according to the invention with a separator 13, wherein the separator 13 is arranged between the first clamping unit 2 and the at least one second clamping unit 8.

FIGS. 4*a* and 4*b* show examples of a position of the separator 13, in which the separator 13 is located between the first mold region 14 and the second mold region 15 and wherein one mold 5 is carried by the first clamping unit 2 and one mold 5 is carried by the second clamping unit 8. FIG. 4*a* is a perspective view of the arrangement 1; FIG. 4*b* is a top view or side view of the arrangement 1.

FIG. 4*c* shows a top view or side view of an arrangement 1, in which the separator 13 is located outside the first mold region 14 and the second mold region 15 and a single mold 5 is jointly carried by the first clamping unit 2 and the second clamping unit 8.

In the example of FIG. 4*c* the first movable platen 4 and the second movable platen 10 are in a coplanar position and the jointly carried mold 5 has a cuboid shape.

Figure 5A:
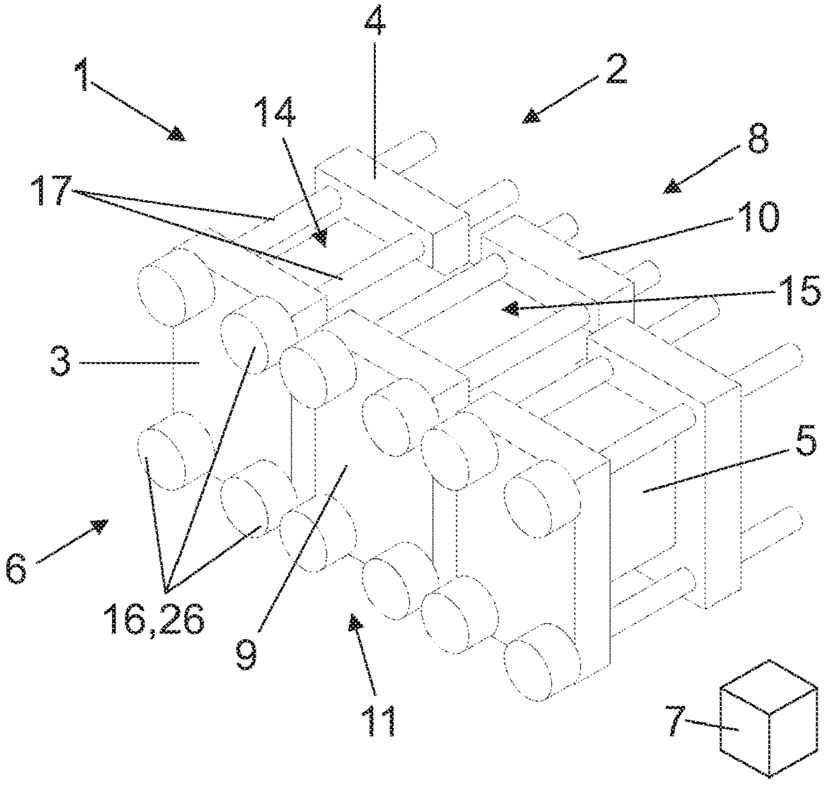
FIGS. 5*a-b* show one embodiment of an arrangement with a jointly carried mold.
Figure 5B:
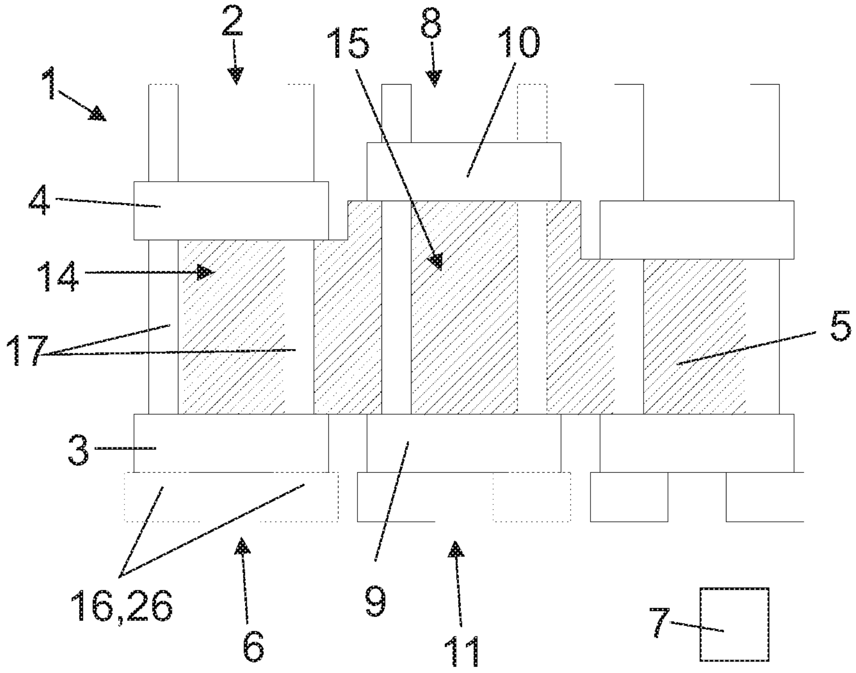

FIGS. 5*a* and 5*b* show an embodiment of an arrangement 1 according to the invention, in which a third clamping unit is arranged next to (adjacent to) the first clamping unit 2 and the second clamping unit 8, and all three clamping units jointly carry one mold 5. FIG. 5*a* is a perspective view and FIG. 5*b* is a top view or side view of the arrangement 1.

In this embodiment, the spacing between the first fixed platen 3 and the first movable platen 4 of the first clamping unit 2 differs from the spacing between the second fixed platen 9 and the second movable platen 10 of the second clamping unit 8 and/or from the spacing between a third fixed platen and a third movable platen of a third clamping unit, and the shape of the jointly carried mold 5 is stepped.

As a single stepped mold 15 is jointly carried by the first clamping unit 2 and the second clamping unit 8 and the third clamping unit in the embodiment in FIGS. 5*a* and 5*b*, the first movable platen 4 and the second movable platen 10 and the third movable platen are displaced synchronously by the control unit 7, as noted above.

If, however, several molds 15 are carried by the first clamping unit 2 and the second clamping unit 8 and possible further clamping units, only those movable platens which jointly carry one mold 15 are displaced synchronously.

As an alternative to the fact that each of the clamping units can have its own fixed platen, it is also conceivable for several clamping units to share one fixed platen.

The at least one movable platen of the at least one clamping unit which solely carries a mold can be displaced asynchronously relative to the movable platens of the other clamping units which can jointly carry a mold.

Figure 6A:
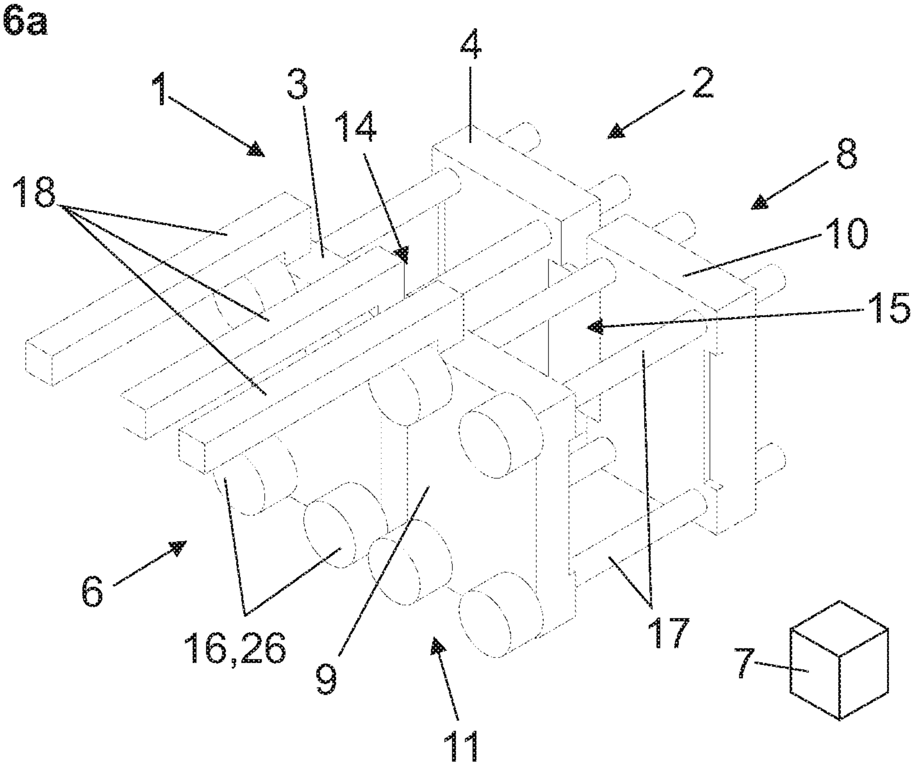
FIGS. 6*a-b* show one embodiment of an arrangement with pulling devices.
Figure 6B:
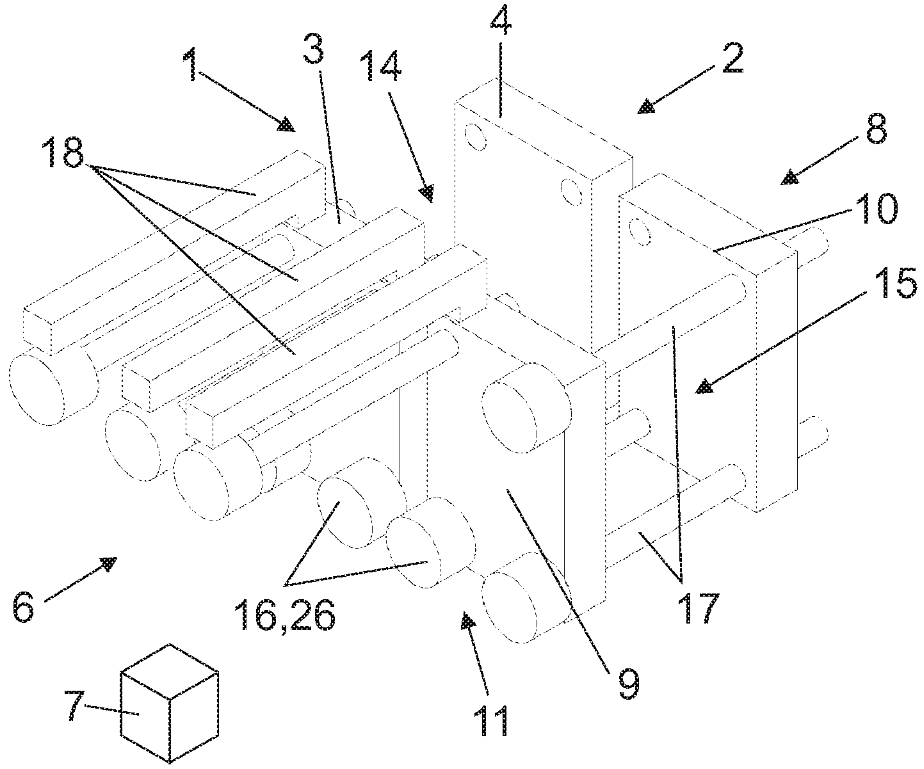

FIGS. 6*a* and 6*b* show perspective views of an embodiment of an arrangement 1 according to the invention with pulling devices 18 which are arranged on some or all of the tension rods 17.

FIG. 6*a* shows a position in which the tension rods 17 are located in the first mold region 14 and in the second mold region 15.

FIG. 6*b* shows a position in which the tension rods 17 have been partially pulled out of the first mold region 14 and/or the second mold region 15.

An arrangement of pulling devices 18 in particular on the upper tension rods 17 makes sense in order to simplify a lifting in and/or out of the at least one mold 5.

FIGS. 7*a*-7*f* show perspective views of six embodiments of an arrangement 1 according to the invention with several injection units 19 which are arranged in a different manner spatially.

The arrangement of the injection units 19 can be effected at all possible angles to the clamping axes of the first clamping unit 2 and/or the second clamping unit 8.

Moreover, the injection units 19 can be arranged such that they can be pressed against the at least one mold 5 by means of the openings provided for this purpose in the first fixed platen 3 and/or the second fixed platen 9 and/or the first movable platen 4 and/or the second movable platen 10 and/or over the first mold region 14 and/or the second mold region.

Figure 7A:
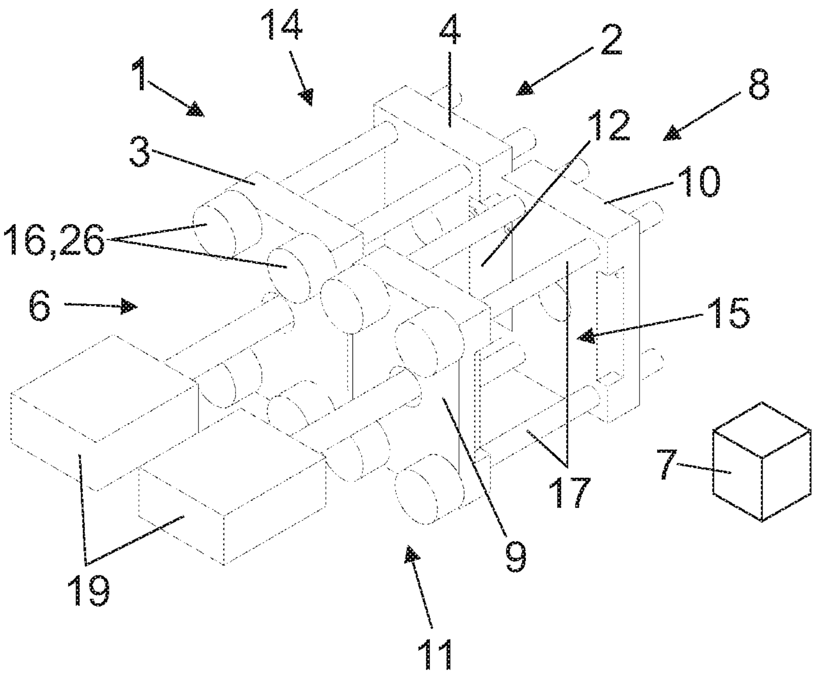
FIGS. 7*a-f* show six embodiments of an arrangement with different arrangements of injection units.

FIG. 7*a* shows an example of an arrangement 1 with two injection units 19, wherein the injection units 19 are arranged in each case on the first fixed platen 3 of the first clamping unit 2 and the second fixed platen 9 of the second clamping unit 8 in directions parallel to the clamping axes and can be pressed against the at least one mold and/or the platens themselves by means of the openings provided for this purpose.

Figure 7B:
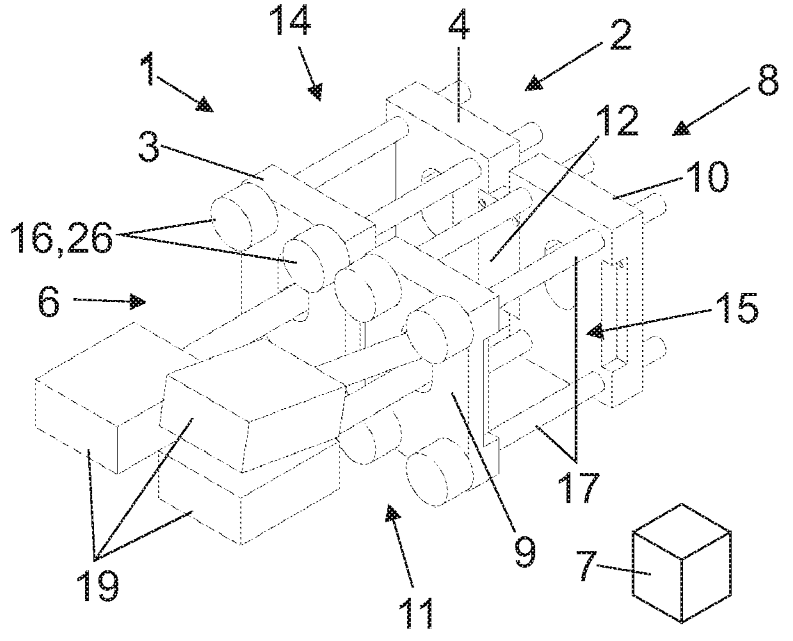

FIG. 7*b* shows an example of an arrangement 1 with three injection units 19, wherein two injection units 19 can be pressed in each case against an opening in the first fixed platen 3 of the first clamping unit 2 and the second fixed platen 9 of the second clamping unit 8 and in directions parallel to the clamping axes, and wherein one of these three injection units 19 is arranged tilted relative to the clamping axis of the second clamping unit 8.

Figure 7C:
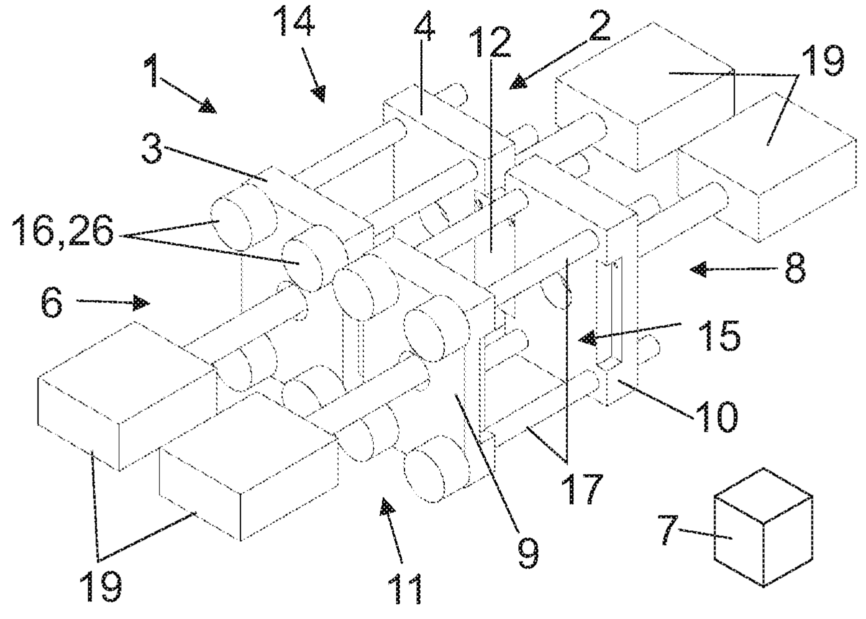

FIG. 7*c* shows an example of an arrangement 1 with four injection units 19, wherein one injection unit 19 can be pressed against an opening in the first fixed platen 3, one injection unit can be pressed against an opening in the second fixed platen 9, one injection unit 19 can be pressed against an opening in the first movable platen 4, and one injection unit 19 can be pressed against an opening in the second movable platen 10, and wherein all four injection units 19 are arranged parallel to the clamping axes.

Figure 7D:
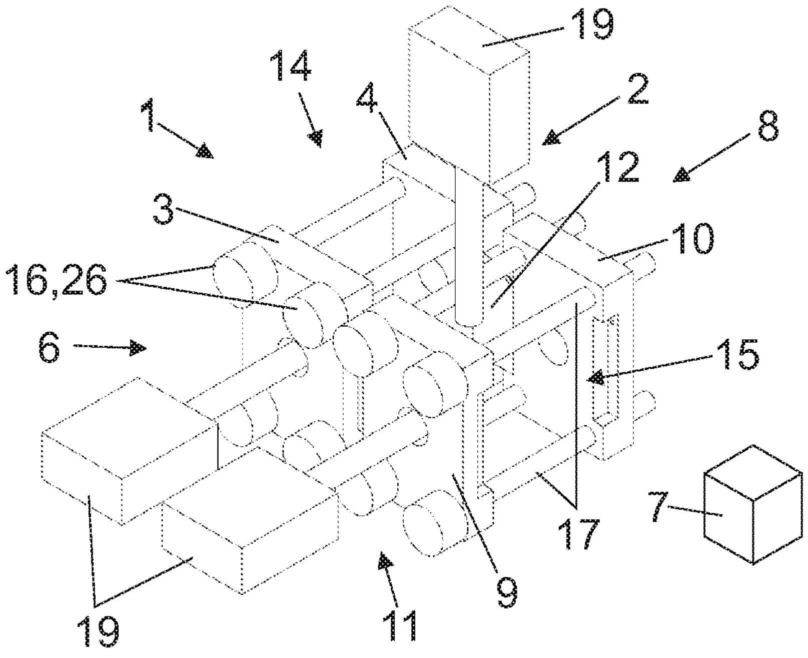

FIG. 7*d* shows an example of an arrangement 1 with three injection units 19, wherein two injection units 19 are pressed in each case against an opening in the first fixed platen 3 and the second fixed platen 9 and are arranged parallel to the clamping axes, and wherein one injection unit 19 is arranged in perpendicular and vertical alignment with the clamping axis of the first clamping unit 2 and/or the second clamping unit 8 and is pressed against the mold 5 directly over the first mold region 14 and/or the second mold region 15.

Figure 7E:
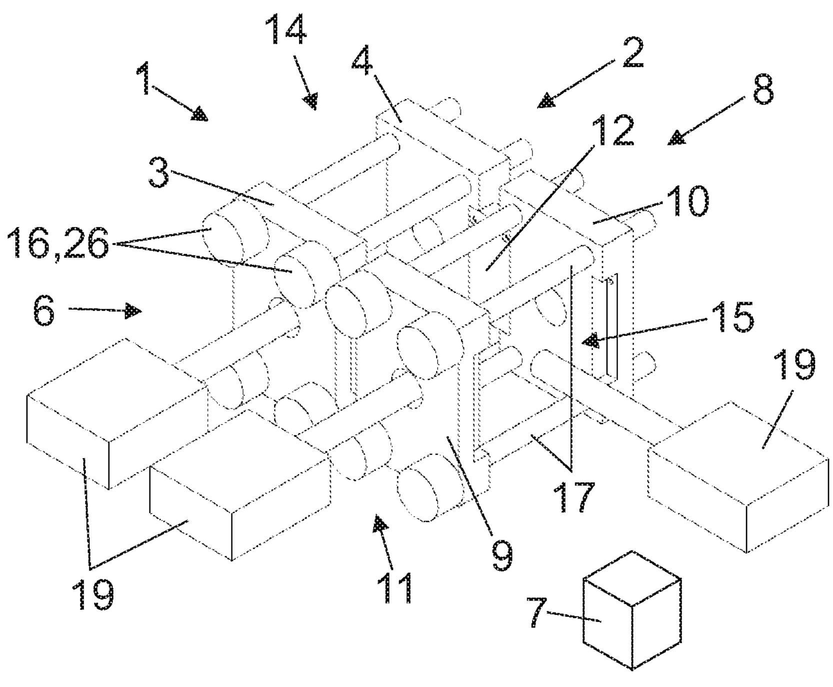

FIG. 7*e* shows an example of an arrangement 1 with three injection units 19, wherein two injection units 19 are arranged in each case against an opening in the first fixed platen 3 and the second fixed platen 9 in alignments parallel to the clamping axes, and wherein one injection unit 19 is arranged in a horizontal direction and in a direction perpendicular to the clamping axis of the first clamping unit 2 and/or the second clamping unit 8.

Figure 7F:
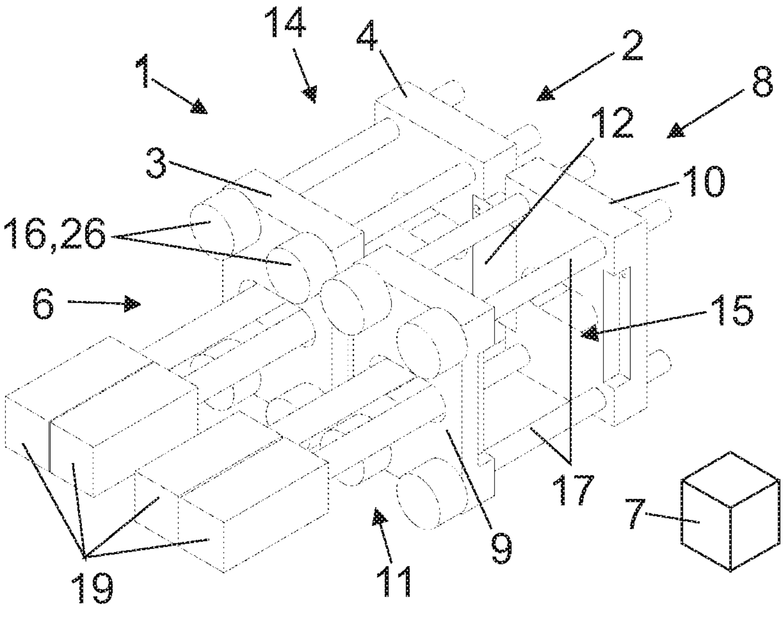

FIG. 7*f* shows an embodiment of an arrangement 1 with four injection units 19, wherein in each case two injection units 19 are arranged together against at least one opening of the first fixed platen 3 of the first clamping unit 2 and/or the second fixed platen 9 of the second clamping unit 8 in directions parallel to the clamping axes.

The injection units 19 could also be arranged against separate openings.

Any other arrangements of injection units 19 are generally possible.

Figure 8A:
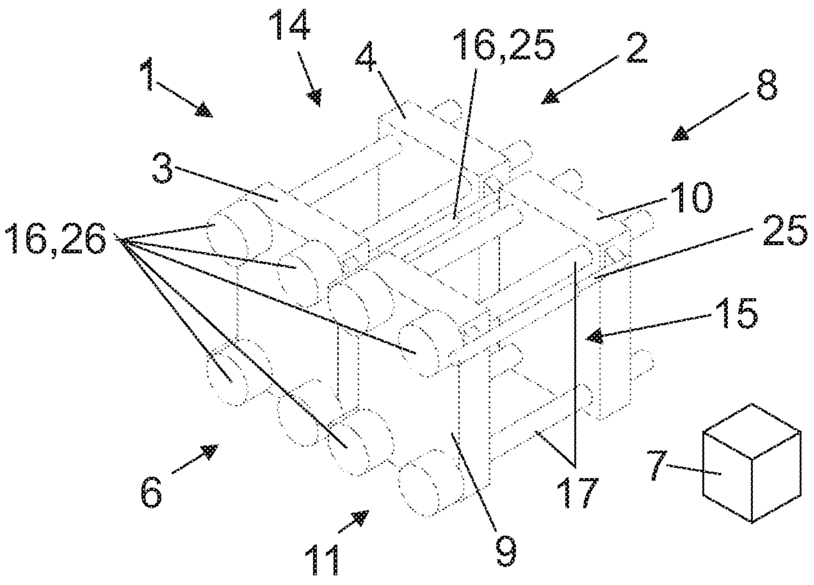
FIGS. 8*a-b* show one embodiment of an arrangement according to the invention with fast stroke drives.
Figure 8B:
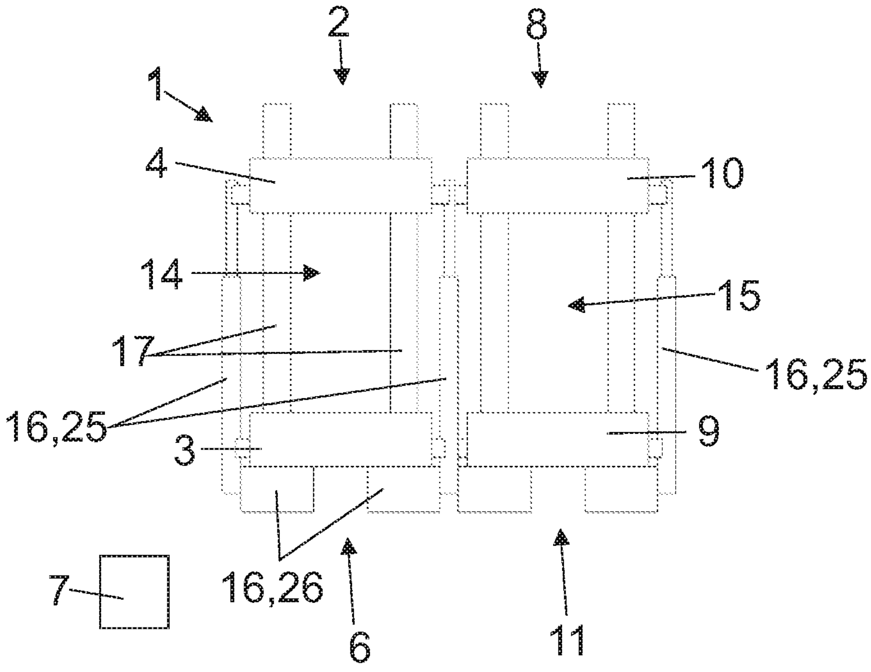

FIGS. 8*a* and 8*b* show an embodiment of an arrangement 1 according to the invention, in which not only drives 16 in the form of power stroke drives 26 for the clamping force application but also fast stroke drives 25 for carrying out a fast stroke movement are shown.

In this embodiment the first clamping unit 2 and the at least one second clamping unit 8 in each case have at least two fast stroke drives 25.

FIGS. 9*a-d* show four examples of hydraulic circuit diagrams, in particular with fast stroke drives 25 for carrying out a fast stroke movement, for an arrangement according to the invention.

All following circuit diagrams relate to two clamping units arranged against each other, i.e. next to each other or one above the other (collectively referred to as adjacent to each other). The principles of these circuit diagrams can, however, be transferred to any desired number of clamping units arranged against each other, i.e. next to each other and/or one above another.

Figure 9A:
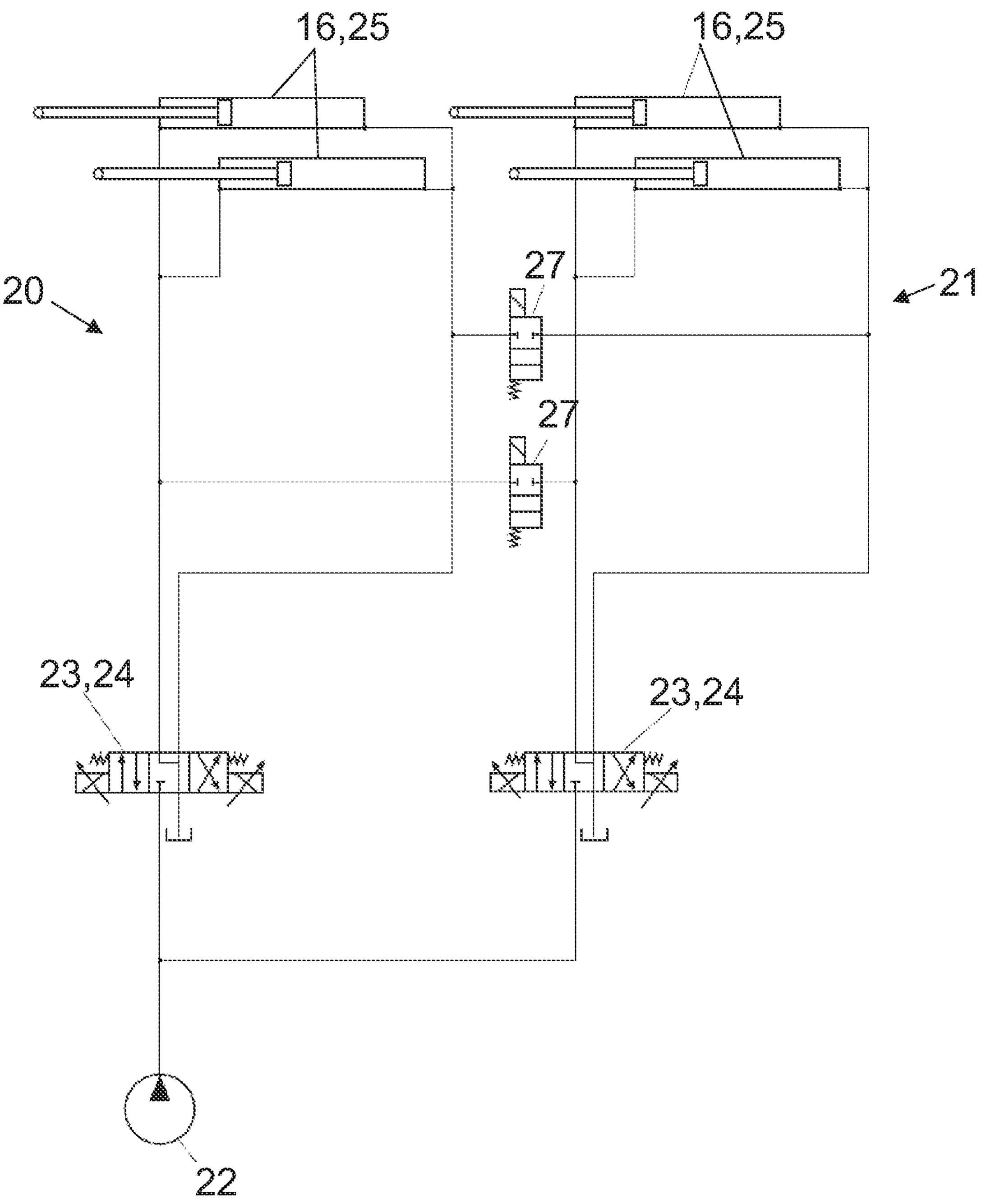
FIGS. 9*a-d* show four examples of a hydraulic circuit diagram for a fast stroke for an arrangement according to the invention.

FIG. 9*a* shows a circuit diagram for two clamping units arranged against each other with in each case two hydraulic drives 16, in particular fast stroke drives 25, wherein by a hydraulic drive 16 is meant in particular a hydraulic cylinder.

As this embodiment involves in particular a circuit diagram for at least one fast stroke movement, the drives 16 are preferably fast stroke drives 25.

Fast stroke drives generally serve to carry out a rapid movement or shift of movable platens for the purpose of closing and opening movements of a clamping unit.

It may also be the case that the drives 16 are power stroke drives 26, which are provided for the clamping force application to a mold.

During the power stroke, the movements or shifts of the platens are usually very small or negligibly small.

It may be mentioned that the movable platens to which a clamping force has been applied by the hydraulic cylinders are not represented in any of FIGS. 9*a-d*.

In the embodiment of FIG. 9*a* the first clamping unit 2 and the second clamping unit 8 and consequently the first movable platen 4 and the second movable platen 10 are in a force-free position.

No power stroke takes place in a force-free position. However, precisely a fast stroke could take place in this position or in the case of the circuitry in FIG. 9*a*.

The circuit diagram of FIG. 9*a* furthermore represents a separate individual operation.

That is to say the first movable platen 4 and the second movable platen 10 are operated independently of each other in this example.

Thus, the movement directions and/or the speeds of the first clamping force mechanism 6 and/or the at least one fast stroke drive 25 of the first clamping unit 2 and the second clamping force mechanism 11 and/or the at least one fast stroke drive 25 of the at least one second clamping unit 8 can be set independently of each other.

In FIG. 9*a*, the first hydraulic cylinder pair, in particular in the form of fast stroke drives 25, is connected to a first hydraulic line system 20 and the second cylinder pair, in particular in the form of fast stroke drives 25, is connected to a second hydraulic line system 21.

Moreover, all drives 16, in particular fast stroke drives 25, are fed via a single pump system 22 here.

FIG. 9*a* also shows control valves 27 which serve for coupling the first hydraulic line system 20 and the second hydraulic line system 21.

This means that the fast stroke drives 25 of the first clamping unit 2 and the fast stroke drives 25 of the second clamping unit 8 can be controlled coupled or independently of each other.

It is preferably provided that the control valves 27 between the first hydraulic line system 20 and the second hydraulic line system 21 for the separate individual operation, as represented in FIG. 9*a*, are in an energized or connected state.

A currentless state of the control valves 27 in the coupled state is advantageous from a mechanical and/or drive-technology and/or safety-technology point of view.

In the circuit diagram in FIG. 9*a* the control valves 27 are set such that the first hydraulic line system 20 and the second hydraulic line system 21 are in a decoupled state.

The control valves 27 are thus preferably in the energized state here.

It is generally possible for not only two hydraulic line systems but any desired number of hydraulic line systems to be coupled to each other, wherein the number of hydraulic line systems preferably corresponds to the number of clamping units arranged against each other.

In all descriptions of examples of hydraulic circuit diagrams that follow, primarily the differences from the example shown in FIG. 9*a* will be discussed, to avoid repetitions. That is to say the description in relation to FIG. 9*a*, to the extent to which it may be applicable, also applies to the examples also described in the following.

Figure 9B:
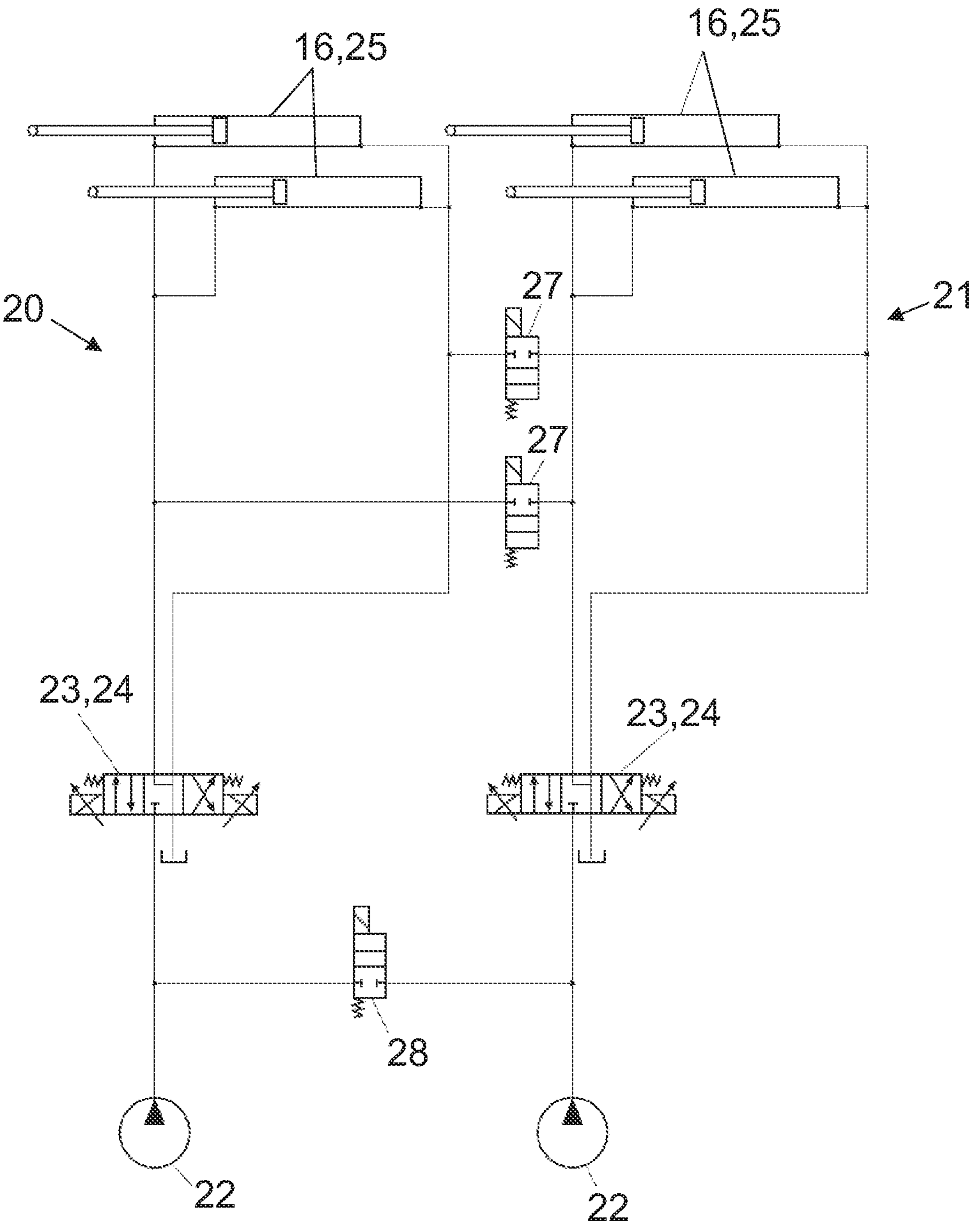

FIG. 9*b* shows a further example of a hydraulic circuit diagram of an arrangement according to the invention operated individually.

Unlike the circuit diagram in FIG. 9*a*, the circuit diagram in FIG. 9*b* comprises two pump systems 22.

Preferably, one pump system 22 is allocated in each case to the first hydraulic line system 20 and to the second hydraulic line system 21.

The at least one pump system 22 can, however, also be arranged at any desired point on the first hydraulic line system 20 and/or on the second hydraulic line system.

As the first clamping unit 2 and the second clamping unit 8 are also operated individually in this embodiment, as already shown in the circuit diagram in FIG. 9*a*, the control valves 27 between the first hydraulic line system 20 and the second hydraulic line system 21 are set here such that the first hydraulic line system 20 and the second hydraulic line system 21 are in a decoupled state.

The first hydraulic line system 20 and the second hydraulic line system 21 are thus preferably fed by one pump system 22 in each case.

Here too, the control valves 27 are preferably energized in the decoupled state.

A pump system control valve 28, via which the two pump systems 22 can be interconnected, is arranged between the two pump systems 22.

In contrast to the control valves 27, which can preferably serve to interconnect the line systems 20, 21, the at least one pump system control valve 28 preferably serves to interconnect the pump systems 22.

In this embodiment the pump system control valve 28 is preferably in the energized state, with the result that the pump systems 22 are decoupled.

Figure 9C:
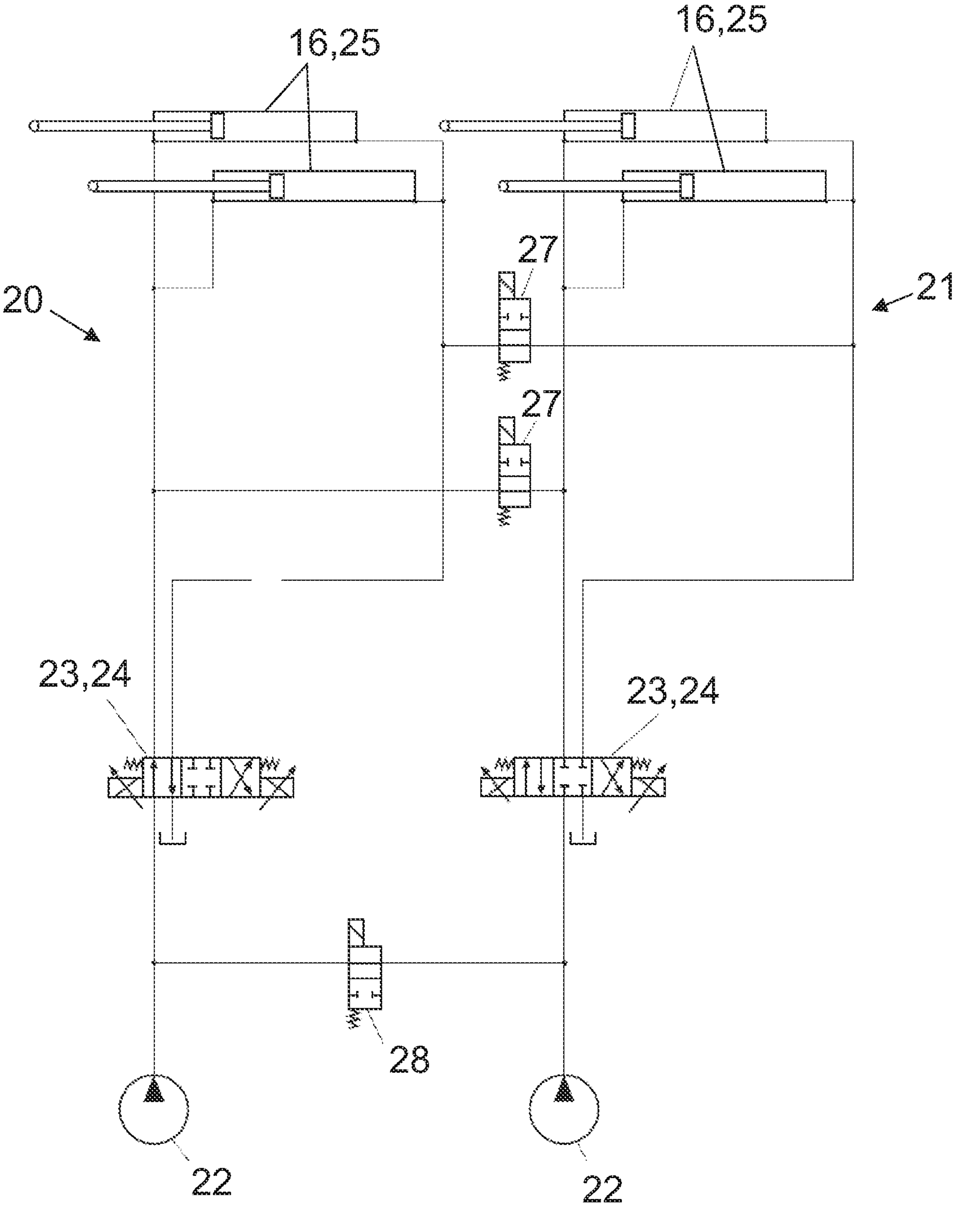

FIG. 9*c* shows a hydraulic circuit diagram of an arrangement according to the invention with the same circuit elements as are shown in FIG. 9*b*. However, these circuit elements are set such that the first clamping unit 2 and the second clamping unit 8 are operated in parallel.

This means that the first clamping unit 2 and the second clamping unit 8 are controllable or regulatable completely synchronously, and that the first movable platen 4 and the second movable platen 10 are movable and/or a clamping force can be applied to them synchronously.

The fast stroke drives 25 of the first clamping unit 2 are preferably fed via the first hydraulic line system 20 and controlled or regulated via a valve 23, in particular proportional valve 24, and the fast stroke drives 25 of the second clamping unit 8 are fed via the second hydraulic line system 21 and controlled or regulated via a further valve 23, in particular proportional valve 24.

Furthermore, two control valves 27 are preferably arranged between the first hydraulic line system 20 and the second hydraulic line system 21, and a pump system control valve 28 is arranged between the two pump systems 22.

In the embodiment of a circuit diagram in FIG. 9*c* the control valves 27 between the first hydraulic line system 20 and the second hydraulic line system 21 are in a coupled, and preferably currentless, state, with the result that all fast stroke drives 25 present are coupled to each other.

Furthermore, the pump system control valve 28 between the pump systems 22 is set here such that the pump systems 22 are interconnected.

Here, it can furthermore be seen that all fast stroke drives 25 present are controlled or regulated by a single valve 23, in particular proportional valve 24, (represented on the left-hand side) via the coupled line systems.

All fast stroke drives 25 could also be fed using a single pump system 22. For this, the pump system control valve 28 between the two pump systems 22 would have to be set to a decoupled state.

Parallel operation of the fast stroke drives 25 of the first clamping unit 2 and the fast stroke drives 25 of the second clamping unit 8 with a single pump system 22 is preferably used in the case of lower required speeds of the hydraulic cylinders.

Controlling all hydraulic cylinders via a single valve 23, in particular proportional valve 24, has the advantage that only one proportional valve 24 is relevant in terms of control technology for the entire movement sequences of the first clamping unit 2 and the second clamping unit 8 and the setting and/or control or regulation is therefore easier.

On the other hand, in the case of the control or regulation by means of a single valve 23, in particular proportional valve 24, the valve 23, in particular proportional valve 24, would have to be chosen to be correspondingly large because of the large number of hydraulic cylinders to be actuated.

That can furthermore result in the disadvantage that in the case of very slow movements and/or when the first clamping unit 2 and the second clamping unit 8 are operated individually the sharpness, i.e. the precision of the control, is worse.

Figure 9D:
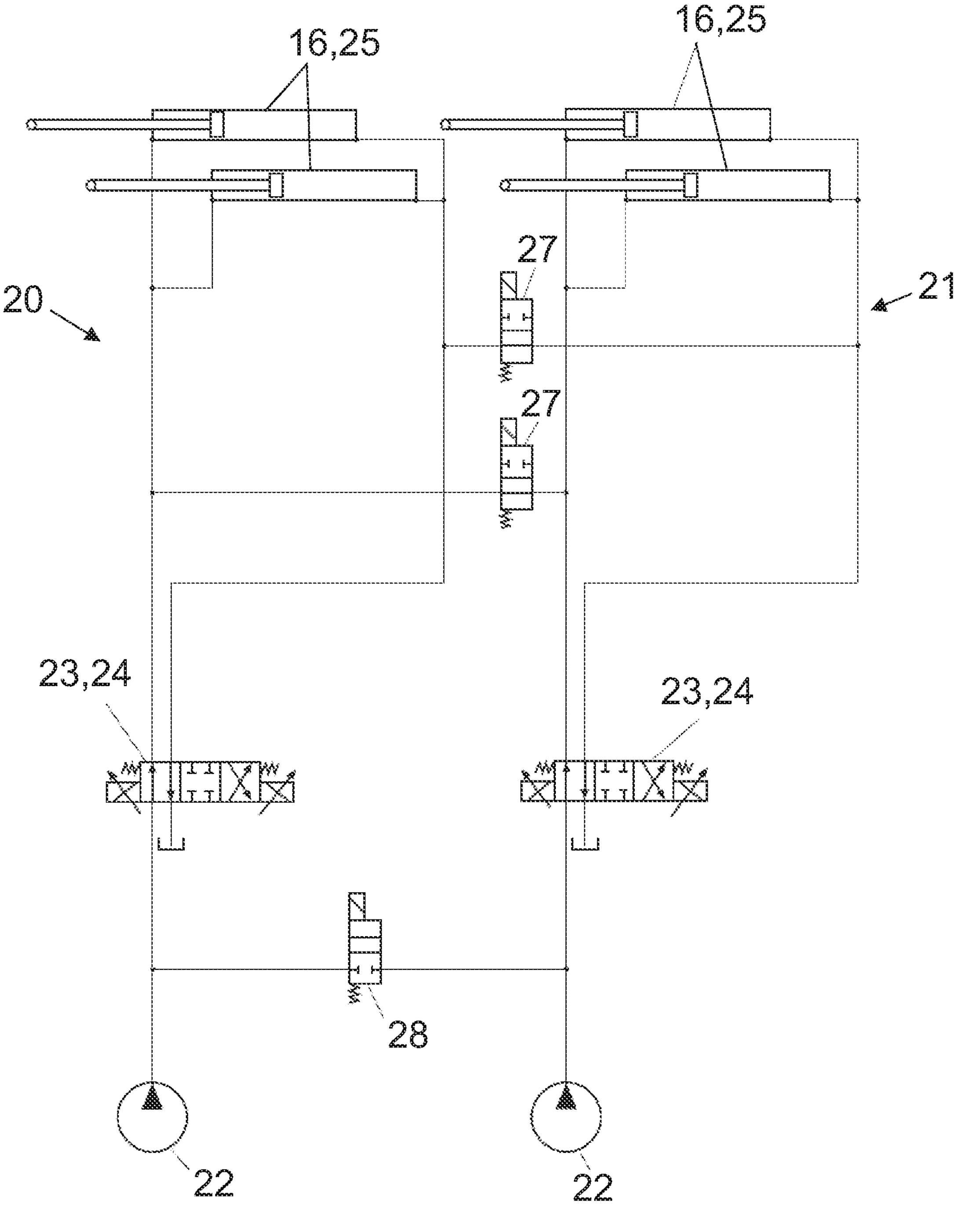

FIG. 9*d* shows a further example of a circuit diagram for a parallel operation of two clamping units arranged against each other, wherein the disadvantage of the use of a single large valve 23, in particular proportional valve 24, can be avoided in parallel operation.

Here, a circuit diagram is shown in which the first hydraulic line system 20 and the second hydraulic line system 21 can be coupled to each other by means of two control valves 27, wherein these can be fed by two pump systems 22, and wherein the control of the first clamping force mechanism 6 and/or the fast stroke drives 25 of the first clamping unit 2 and the second clamping force mechanism 11 and/or the fast stroke drives 25 of the second clamping unit 8 can be effected by means of at least two valves 23, in particular proportional valves 24.

An advantage of the circuit diagram in FIG. 9*d* is the possibility of being able to optimize the valves 23 used, in particular proportional valves 24, for the respective hydraulic line system and/or the respective clamping force mechanism and/or fast stroke drive.

This means for example that the proportional valve 24 represented on the left can be optimized for the first hydraulic line system 20 and/or the first clamping force mechanism 6 and/or the fast stroke drives 25 of the first clamping unit 2.

In the same way, the proportional valve 24 represented on the right can be optimized for the second hydraulic line system 21 and/or the second clamping force mechanism 11 and/or the fast stroke drives 25 of the second clamping unit 8.

Through the optimization of the valves 23, in particular proportional valves 24, in parallel operation identical speeds of all hydraulic cylinders and/or identical clamping force profiles and/or clamping force sequences can be achieved.

In FIG. 9*d* the control valves 27 are connected such that the first hydraulic line system 20 and the second hydraulic line system 21 are coupled, which preferably corresponds to a currentless position.

That can have the advantage that in the event of failure, for example if a valve 23, in particular proportional valve 24, fails, a hydraulic compensation between the first hydraulic line system 20 and the second hydraulic line system 21 is guaranteed.

As the control valves 27 between the first hydraulic line system 20 and the second hydraulic line system 21 can have great importance in drive-technology and/or mechanical and/or safety-technology terms in parallel operation, it is preferably provided that the control valves 27 are electrically monitored.

All valves 23, in particular proportional valves 24, and/or control valves 27 and/or pump system control valves 28 are favorably electrically monitored.

For example, with an electrical monitoring of the valves 23, in particular proportional valves 24, and/or control valves 27 and/or pump system control valves 28 a controlled operation stop can be triggered in the event of failure.

Figure 10:
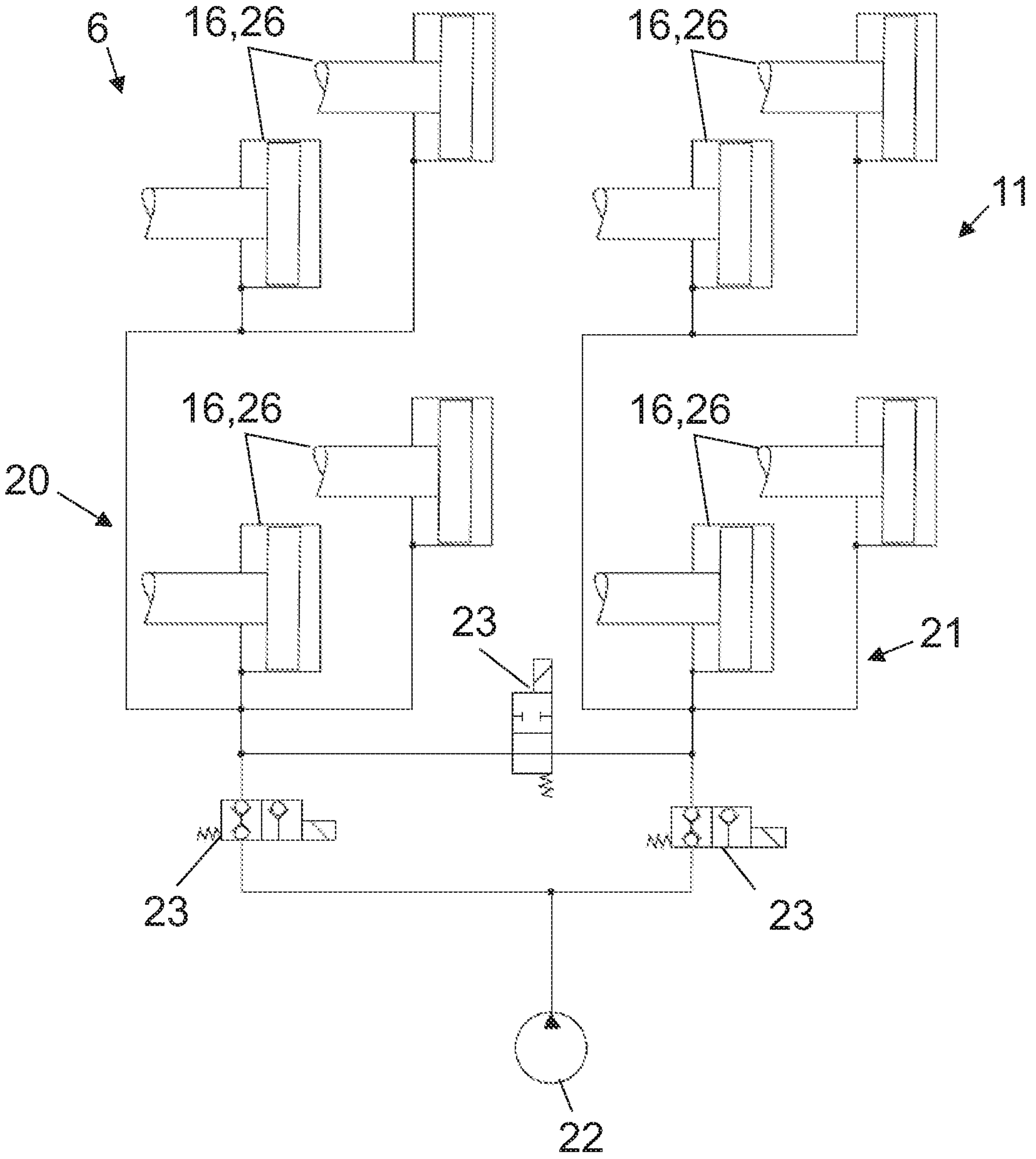
FIG. 10 shows one example of a hydraulic circuit diagram for a power stroke for an arrangement according to the invention.

FIG. 10 shows an example of a hydraulic circuit diagram, in particular with power stroke drives 26 for implementing a power stroke, for an arrangement according to the invention.

In this example the first hydraulic line system 20 and the second hydraulic line system 21, wherein each system or each clamping force mechanism 6, 11 in each case comprises four drives 16 or power stroke drives 26 respectively, are fed by a pump system 22 and coupled to each other by means of a control valve 27.

The totality of the hydraulic drives 16, in particular power stroke drives 26, of an individual clamping unit is to be understood as a single clamping force mechanism.

This means that the four hydraulic drives 16, thus the four hydraulic cylinders, of the first clamping unit 2 correspond to the first clamping force mechanism 6, and that the four hydraulic drives 16 of the second clamping unit 8 correspond to the second clamping force mechanism 11.

This circuit diagram relates to the control or regulation of power stroke drives 26, such as e.g. pressure cushions.

The examples of circuit diagrams shown in FIGS. 9*a-d* and 10 are not a complete statement of possible variants.

Other circuitries are also conceivable provided they make a reasonable operation of two or more clamping units arranged against each other possible.

From a hydraulic point of view the same principles apply in general to circuit diagrams for fast stroke movements and for power strokes.

A circuit diagram should at least satisfy safety-technology aspects, but can depend on a wide variety of requirements and/or objectives, for example the conditions of a molding machine and/or a mold and/or the production sequences and/or the material requirements etc.

LIST OF REFERENCE NUMBERS

1 arrangement according to the invention
2 first clamping unit
3 first fixed platen
4 first movable platen
5 mold
6 first clamping force mechanism
7 control or regulating unit
8 second clamping unit
9 second fixed platen
10 second movable platen
11 second clamping force mechanism
12 mechanical movement coupling
13 separator

14 first mold region
15 second mold region
16 drive
17 tension or pressure rod
18 pulling device
19 injection unit
20 first hydraulic line system
21 second hydraulic line system
22 pump system
23 valve
24 proportional valve
25 fast stroke drive
26 power stroke drive
27 control valve
28 pump system control valve

The invention claimed is:

1. An arrangement for a molding machine, comprising:
   a first clamping unit including:
      a first fixed platen,
      a first movable platen to be moved relative to the first fixed platen, the first fixed platen and the first movable platen being configured to carry at least one mold,
      a first clamping force mechanism configured to apply a clamping force to the first movable platen,
   a control unit configured to control the first clamping force mechanism,
   a second clamping unit arranged adjacent to the first clamping unit, the second clamping unit including:
      a second fixed platen,
      a second movable platen to be moved relative to the second fixed platen, the second fixed platen and the second movable platen being configured to carry at least one mold, and
      a second clamping force mechanism configured to apply a clamping force to the second movable platen,
   wherein the control unit is further configured to control the second clamping force mechanism, and
   wherein the control unit is configured to actuate the first clamping force mechanism and the second clamping force mechanism to apply a synchronous clamping force to the first clamping force mechanism and the second clamping force mechanism (i) when the first fixed platen, the first movable platen, the second fixed platen, and the second movable platen jointly carry one single integral mold, and (ii) when the first fixed platen, the first movable platen, the second fixed platen, and the second movable platen carry a plurality of separate molds.

2. The arrangement according to claim 1, wherein the control unit is configured to move the first movable platen and the second movable platen synchronously.

3. The arrangement according to claim 1, wherein the second clamping unit is configured such that a second clamping axis of the second clamping unit is aligned parallel or perpendicular to a first clamping axis of the first clamping unit.

4. The arrangement according to claim 1, wherein the first clamping unit and the second clamping unit have a mechanical movement coupling.

5. The arrangement according to claim 1, wherein the control unit is configured to control the first clamping unit and the second clamping unit coupled.

6. The arrangement according to claim 1, further comprising a movable separator between the first clamping unit and the second clamping unit, the movable separator configured to be located outside a first mold region of the first clamping unit and a second mold region of the second clamping unit when the first fixed platen, the first movable platen, the second fixed platen, and the second movable platen jointly carry the one single integral mold.

7. The arrangement according to claim 1, wherein the first clamping force mechanism and/or the second clamping force mechanism includes a hydraulic drive and/or an electric drive.

8. The arrangement according to claim 1, wherein the first clamping force mechanism and/or the second clamping force mechanism includes tension rod or a pressure rod.

9. The arrangement according to claim 8, wherein the first clamping force mechanism and/or the second clamping force mechanism includes the tension rod configured to penetrate the first fixed platen and the first movable platen and/or the second fixed platen and the second movable platen.

10. The arrangement according to claim 8, further comprising a pulling device configured to move the tension rod in a direction of a first clamping axis of the first clamping unit and/or a direction of a second clamping axis of the second clamping unit to arrange the tension rod outside the first mold region of the first clamping unit and/or outside the second mold region of the second clamping unit.

11. The arrangement according to claim 1, wherein the first fixed platen and the second fixed platen are formed as a single, unitary, fixed platen to thereby form a common fixed platen for the first clamping unit and the second clamping unit.

12. The arrangement according to claim 1, wherein the first clamping unit further includes a first fast stroke drive different from the first clamping force mechanism, and/or the second clamping unit includes a second fast stroke drive different from the second clamping force mechanism, the first fast stroke drive and the second fast stroke drive being configured to provide a fast stroke movement to the first movable platen and/or to the second movable platen.

13. The arrangement according to claim 1, wherein the first clamping force mechanism and/or the second clamping force mechanism includes a toggle joint.

14. The arrangement according to claim 1, wherein the first clamping force mechanism and/or the second clamping force mechanism includes a locking device.

15. The arrangement according to claim 1, further comprising an injection unit.

16. The arrangement according to claim 1, wherein the first clamping force mechanism is connected to a first hydraulic line system, and the second clamping force mechanism is connected to a second hydraulic line system, the first hydraulic line system and the second hydraulic line system being configured to be coupled to each other.

17. The arrangement according to claim 16, further comprising a control valve configured to allow the first hydraulic line system and the second hydraulic line system to be coupled together, the control valve being arranged between the first hydraulic line system and the second hydraulic line system.

18. The arrangement according to claim 16, wherein the first hydraulic line system and/or the second hydraulic line system are connected to a pump system.

19. The arrangement according to claim 1, wherein the first hydraulic line system and/or the second hydraulic line system are configured to be controlled by a proportional valve.

20. A molding machine comprising the arrangement according to claim 1.

21. A method of operating the arrangement according to claim 1, the method comprising:

applying a first partial clamping force to the first movable platen of the first clamping unit by the first clamping force mechanism, and applying a second partial clamping force the second movable platen of the second clamping unit by the second clamping force mechanism, wherein the first partial clamping force and the second partial clamping force are applied synchronously.

22. The arrangement according to claim 7, wherein the hydraulic drive is a hydraulic cylinder, and the electric drive is a spindle drive.

* * * * *